US010054728B2

(12) United States Patent
Kwon et al.

(10) Patent No.: US 10,054,728 B2
(45) Date of Patent: Aug. 21, 2018

(54) COMPOSITION FOR OPTICAL FILM AND FILMS AND DISPLAY DEVICE

(71) Applicant: SAMSUNG ELECTRONICS CO., LTD., Suwon-si, Gyeonggi-do (KR)

(72) Inventors: Bok Soon Kwon, Seoul (KR); Sang Ho Park, Anyang-si (KR); Joungeun Yoo, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 187 days.

(21) Appl. No.: 14/955,527

(22) Filed: Dec. 1, 2015

(65) Prior Publication Data

US 2016/0152896 A1 Jun. 2, 2016

(30) Foreign Application Priority Data

Dec. 1, 2014 (KR) ........................ 10-2014-0169676

(51) Int. Cl.
| | | |
|---|---|---|
| *C09K 19/56* | (2006.01) | |
| *G02B 5/30* | (2006.01) | |
| *C09K 19/40* | (2006.01) | |
| *C09K 19/20* | (2006.01) | |
| *G02F 1/13363* | (2006.01) | |
| *G02B 1/11* | (2015.01) | |
| *C09K 19/04* | (2006.01) | |

(52) U.S. Cl.
CPC .......... *G02B 5/3083* (2013.01); *C09K 19/406* (2013.01); *G02B 5/3016* (2013.01); *C09K 2019/0448* (2013.01); *C09K 2019/2078* (2013.01); *G02B 1/11* (2013.01); *G02F 1/13363* (2013.01); *Y10T 428/10* (2015.01); *Y10T 428/1036* (2015.01)

(58) Field of Classification Search
CPC .. C09K 19/56; C09K 19/2007; C09K 19/406; C09K 2019/0448; C09K 2019/2078; G05B 5/3016; G05B 5/3083; G02F 1/13363; G02F 2001/133633; G02F 2001/133638; Y10T 428/10; Y10T 428/1036; Y10T 428/1041; Y10T 428/1045
USPC ......... 428/1.1, 1.3, 1.31–1.33; 349/117, 118, 349/183; 252/299.4
See application file for complete search history.

(56) References Cited

U.S. PATENT DOCUMENTS

| | | |
|---|---|---|
| 6,427,941 B1 | 8/2002 | Hikita |
| 7,042,540 B2 | 5/2006 | Yano et al. |
| 7,075,604 B2 | 7/2006 | Yano et al. |

(Continued)

FOREIGN PATENT DOCUMENTS

| | | |
|---|---|---|
| GB | 227392 | 9/1924 |
| JP | 4147370 | 7/2008 |

(Continued)

OTHER PUBLICATIONS

C.L. Mulder et al. "Dye alignment in luminescent solar concentrators: I. Vertical alignment for improved waveguide coupling", Optics Express, 2010, vol. 18, No. 51, 12 pp.

(Continued)

*Primary Examiner* — Ruiyun Zhang
(74) *Attorney, Agent, or Firm* — Cantor Colburn LLP

(57) ABSTRACT

A composition for an optical film, including a homeotropic liquid crystal, a silane or germane compound including at least one fluorine at a terminal end thereof, and a polymerizable compound.

18 Claims, 31 Drawing Sheets

(56) References Cited

U.S. PATENT DOCUMENTS

| | | |
|---|---|---|
| 7,227,602 B2 | 6/2007 | Jeon et al. |
| 7,283,189 B2 | 10/2007 | Jeon et al. |
| 7,532,283 B2 | 5/2009 | Yano et al. |
| 7,588,806 B2 | 9/2009 | Hirai |
| 7,764,339 B2 | 7/2010 | Suemasu et al. |
| 7,871,538 B2 | 1/2011 | Nishikawa |
| 8,119,026 B2 | 2/2012 | Parri et al. |
| 8,139,188 B2 | 3/2012 | Sakai |
| 8,419,973 B2 | 4/2013 | Hirai |
| 8,470,198 B2 | 6/2013 | Adlem et al. |
| 2005/0195479 A1* | 9/2005 | Ishizaki ............ G02F 1/133514 359/487.02 |
| 2006/0257078 A1 | 11/2006 | Kawahara et al. |
| 2008/0088780 A1* | 4/2008 | Nakatsugawa ..... G02F 1/13363 349/118 |
| 2011/0001906 A1 | 1/2011 | Chang et al. |

FOREIGN PATENT DOCUMENTS

| | | |
|---|---|---|
| KR | 101310467 | 9/2013 |
| WO | 2007069613 | 6/2007 |
| WO | 2007122888 | 11/2007 |

OTHER PUBLICATIONS

Frederic J. Kahn et al. "Surface-produced alignment of liquid crystals", Proceedings of the IEEE (Impact Factor 4 93), Aug. 1973, 61(7): 823-828.

Junjie Wang et al. "The driving force for homeotropic alignment of a triphenylene derivative in a hexagonal columnar mesophase on single substrates", Thin Solid Films, 518 (2010) 1973-1979.

Lesley Parry Jones "Alignment Properties of Liquid Crystals", Handbook of Visual Display Technology, (2012) pp. 1387-1402.

Masafumi Yoshio et al. "One-Dimensional Ion-Conductive Polymer Films: Alignment and Fixation of Ionic Channels Formed by Self-Organization of Polymerizable Columnar Liquid Crystals", J. Am. Chem. Soc. 2006, 128, 5570-5577.

Sharon Ann Jewell "Optical waveguide characterisation of hybrid aligned nematic liquid crystal cells", University of Exeter as a thesis for the degree of Doctor of Philosophy in Physics, 2002, 185 pp.

Yu Jin Choi et al. "Development of Wide-Band Compensation Film to Improve Viewing Angle of Vertical Alignment Liquid Crystal Display", Polymer (Korea), vol. 35, No. 4. pp. 337-341, 2011.

* cited by examiner

COMPOSITION FOR OPTICAL FILM AND FILMS AND DISPLAY DEVICE

CROSS-REFERENCE TO RELATED APPLICATION

This application claims priority to and the benefit of Korean Patent Application No. 10-2014-0169676 filed in the Korean Intellectual Property Office on Dec. 1, 2014, the entire contents of which are incorporated herein by reference.

BACKGROUND

1. Field

A composition for an optical film, a film, and a display device are disclosed.

2. Description of the Related Art

Commonly used flat panel displays may be classified into a light-emitting display device emitting light by itself and a non-emissive display device requiring a separate light source. A compensation film such as a retardation film is frequently employed for improving the image quality thereof.

The visibility and the contrast ratio of the light emitting display device, for example, an organic light emitting display, may be deteriorated by reflection of external light caused by a metal such as an electrode. In order to reduce or prevent reflection of the external light by the organic light emitting display and leakage thereof to the outside, the linear polarized light is changed into circularly polarized light by using a polarizing plate and a compensation film.

A liquid crystal display (LCD) as a non-emissive display device uses a compensation film and secures a wide viewing angle thereby, thus compensating retardation generated by liquid crystals.

The compensation film may be a single optical film or a plurality of optical films. The optical film may be formed by applying a liquid crystal film to one side of an alignment layer to control alignment of liquid crystals. However, according to this method, a physical treatment of rubbing the surface of the alignment layer or an photo-treatment such as photo-alignment to control alignment of liquid crystals as well as a separate process of forming the alignment layer is required. Such a treatment process is not only complex, but also causes difficulty in securing the alignment uniformity.

Thus, there remains a need in a thin optical film with improved liquid crystal alignment for use in a display device.

SUMMARY

An embodiment provides a composition for an optical film realizing an optical film without an alignment layer.

Another embodiment provides an optical film realizing liquid crystal alignment without an alignment layer.

Yet another embodiment provides a compensation film including the optical film.

Still another embodiment provides an anti-reflective film including the compensation film.

A further embodiment provides a display device to which the optical film, the compensation film, or the anti-reflective film is applied.

An embodiment provides a composition for an optical film including:
a homeotropic liquid crystal,
a silane or germane compound including at least one fluorine at a terminal end thereof, and
a polymerizable compound.

The silane or germane compound may be represented by Chemical Formula 1.

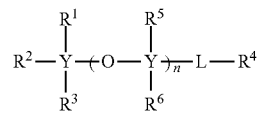

Chemical Formula 1

In Chemical Formula 1,
Y is Si or Ge;
$R^1$ to $R^3$, $R^5$, and $R^6$ are each independently hydrogen, a substituted or unsubstituted C1 to C20 alkyl group, a substituted or unsubstituted C6 to C30 aryl group, a substituted or unsubstituted C1 to C20 alkoxy group, a substituted or unsubstituted C2 to C20 alkoxyalkyl group, a substituted or unsubstituted C2 to C20 alkanoyl group, a substituted or unsubstituted C2 to C20 alkanoyloxy group, a substituted or unsubstituted C2 to C20 alkanoylalkyl group, a substituted or unsubstituted C2 to C20 alkanoyloxyalkyl group, a hydroxy group, or a combination thereof,
L is a single bond, a substituted or unsubstituted C1 to C12 alkylene group, a substituted or unsubstituted C1 to C12 heteroalkylene group, a substituted or unsubstituted C7-C30 alkylarylene group, or a substituted or unsubstituted C7-C30 arylalkylene group,
$R^4$ is fluorine, C1 to C3 fluoroalkyl group or C1 to C3 fluoroalkoxy group, and
n is 0 to 4.

The homeotropic liquid crystal in the composition for an optical film may be represented by Chemical Formula A:

$$(P^1-S^1-X^1)_{n1}\text{-MG-}(X^2-S^2-P^2)_{n2}$$  Chemical Formula A wherein in Chemical Formula A,
MG is a rod-shaped mesogenic group,
$X^1$ and $X^2$ are each independently a single bond, —O—, —S—, —C(=O)—, —C(=O)O—, —O(C=O)—, —O(C=O)O—, any one of groups (a) to (k), or a combination thereof,

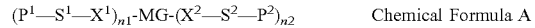

(a)

(b)

(c)

(d)

(e)

(f)

(g)

(h)

(i)

(j)

-continued

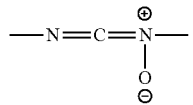
(k)

$S^1$ and $S^2$ are each independently a single bond or a substituted or unsubstituted C1 to C30 spacer group, $P^1$ and $P^2$ are each independently a polymerizable functional group, and $n^1$ and $n^2$ are each independently 0 or 1, provided that $n^1$ and $n^2$ are not simultaneously 0.

The polymerizable compound in the composition for an optical film may be represented by Chemical Formula C:

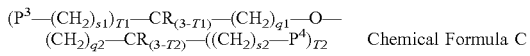
Chemical Formula C wherein in Chemical Formula C,

R is hydrogen or a methyl group, $P^3$ and $P^4$ are each independently a polymerizable functional group, S1, S2, q1, and q2 are each independently 0 or 1, T1 and T2 are each independently 2 or 3.

The polymerizable compound may include a compound having 4 to 10 acryloyl or acryloxy groups.

The composition for an optical film may further include a solvent, and may include about 5 to about 50 percent by weight of the homeotropic liquid crystal, about 0.1 to about 1.1 percent by weight of the silane or germane compound, about 1 to about 10 percent by weight of the polymerizable compound, and the rest of the composition may be a solvent.

The composition for an optical film may further include a photoinitiator, and an amount of the photoinitiator may be about 0.1 to about 2 percent by weight based on the total amount of the composition.

Another embodiment provides an optical film including:

a substrate, and a liquid crystal layer positioned on the substrate, wherein the liquid crystal layer includes a homeotropic liquid crystal, a silane or germane compound including at least one fluorine at a terminal end thereof, and a polymer.

The silane or germane compound may be represented by Chemical Formula 1.

The homeotropic liquid crystal may be arranged in a direction substantially perpendicular to the surface of the substrate, and the silane or germane compound may be arranged in a direction substantially parallel to the homeotropic liquid crystal.

The polymer may be positioned between two homeotropic liquid crystals.

In-plane phase retardation ($R_0$) of the liquid crystal layer for incident light of about a 550 nanometers wavelength may be in a range of about 0 nanometers $\leq R_0 \leq$ about 1 nanometers.

The absolute value of thickness direction retardation ($R_{th}$) of the liquid crystal layer for incident light of a 550 nanometers wavelength may be in a range of about 50 nanometers $\leq R_{th} \leq$ about 300 nanometers.

The liquid crystal layer may have a refractive index satisfying Relationship Equation 1.

$$n_z > n_x = n_y$$ Relationship Equation 1

In Relationship Equation 1, $n_x$ is a refractive index at a slow axis of the liquid crystal layer, $n_y$ is a refractive index at a fast axis of the liquid crystal layer, and $n_z$ is a refractive index in a direction perpendicular to the slow axis and the fast axis of the liquid crystal layer.

An alignment layer may not be interposed between the substrate and the liquid crystal layer.

Yet another embodiment provides a compensation film including the optical film and a phase retardation film positioned on at least one side of the optical film.

The phase retardation film may include a λ/4 phase retardation film, a λ/2 phase retardation film, or a combination thereof.

Yet another embodiment provides an anti-reflective film including the compensation film and a polarizer positioned on the compensation film.

Still another embodiment provides a display device including a display panel, and the optical film, the compensation film, or the anti-reflective film.

The display panel may be a liquid crystal panel or an organic light emitting panel.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
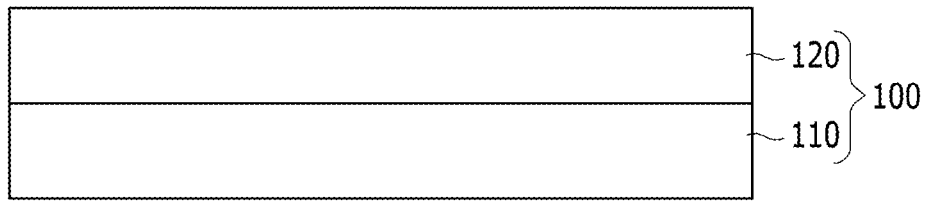
FIGS. 1 and 2 are cross-sectional views showing optical films according to an embodiment.

Exemplary embodiments will hereinafter be described in detail, and may be readily performed by those who have common knowledge in the related art. However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a definition is not otherwise provided, the term 'substituted' refers to one substituted with a substituent selected from a halogen atom (F, Br, Cl, or I), a hydroxy group, a C1 to C20 alkoxy group, a cyano group, an amino group, a C1 to C20 ester group, a C1 to C20 alkyl group, a C2 to C20 alkenyl group, a C2 to C20 alkynyl group, a C6 to C20 aryl group, a C3 to C20 heteroaryl group, and a combination thereof, instead of hydrogen in a compound or a group.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, when a definition is not otherwise provided, the term "alkoxyalkyl" indicates an alkyl group substituted with one or more alkoxy groups, wherein the terms "alkyl" and "alkoxy" have the same meaning as described above.

As used herein, when a definition is not otherwise provided, the term "alkanoyl" represents "alkyl-C(=O)—", wherein the term "alkyl" has the same meaning as described above.

As used herein, when a definition is not otherwise provided, the term "alkanoyloxy" represents "alkyl-C(=O)O—", wherein the term "alkyl" has the same meaning as described above.

As used herein, when a definition is not otherwise provided, the term "alkanoylalkyl" indicates an alkyl group substituted with one or more alkanoyl groups, wherein the terms "alkyl" and "alkanoyl" have the same meaning as described above.

As used herein, when a definition is not otherwise provided, the term "alkanoyloxyalkyl" indicates an alkyl group substituted with one or more alkanoyloxy groups, wherein the terms "alkyl" and "alkanoyloxy" have the same meaning as described above.

As used herein, when a definition is not otherwise provided, the term "aryl" indicates an aromatic hydrocarbon containing at least one ring and having the specified number of carbon atoms.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, when a definition is not otherwise provided, the term "arylene" indicates a divalent group formed by the removal of two hydrogen atoms from one or more rings of an arene, wherein the hydrogen atoms may be removed from the same or different rings of the arene.

As used herein, when a definition is not otherwise provided, the term "heteroalkylene" indicates a straight or branched saturated aliphatic hydrocarbon group having a valence of at least two, optionally substituted with one or more substituents where indicated, provided that the valence of the alkylene group is not exceeded, and including one or more heteroatoms selected from nitrogen (N), oxygen (O), sulfur (S), and phosphorus (P).

As used herein, when a definition is not otherwise provided, the term "alkylarylene" indicates an arylene group substituted with an alkylene group, wherein the terms "arylene" and "alkylene" have the same meaning as described above.

As used herein, when a definition is not otherwise provided, the term "arylalkylene" indicates an alkylene group substituted with an arylene group, wherein the terms "alkylene" and "arylene" have the same meaning as described above.

Hereinafter, a composition for an optical film according to an embodiment is described.

The composition for an optical film according to an embodiment includes:

a homeotropic liquid crystal, a silane or germane compound including at least one fluorine at a terminal end thereof, and a polymerizable compound.

The liquid crystal may be a rod-shaped monomer, oligomer, and/or polymer, and may be, for example, a homeotropic liquid crystal where a long-axis direction of the liquid crystal is arranged in a direction perpendicular to the surface of the substrate.

The liquid crystal may be a reactive mesogen liquid crystal, and may have, for example, at least one polymerizable functional group. The reactive mesogen liquid crystal may include at least one of, for example, a rod-shaped aromatic derivative having at least one polymerizable functional group, 1-methyl propylene glycol, propylene glycol 2-acetate, and a compound represented by formula $P^1-A^1-(Z^1-A^2)_n-P^2$ (wherein $P^1$ and $P^2$ are a polymerizable functional group, which may be independently acryloxy, methacryloxy, acryloyl, methacryloyl, vinyl, vinyloxy, epoxy, or a combination thereof, $A^1$ and $A^2$ are each independently 1,4-phenylene, a naphthalene-2,6-diyl group or a combination thereof, $Z^1$ includes a single bond, —O—, —S—, —C(=O)—, —C(=O)O—, —O(O=O)—, —O(C=O) O—, or a combination thereof, and n is 0, 1, or 2), but is not limited thereto.

The reactive mesogen liquid crystal may be, for example, a compound represented by the following Chemical Formula A.

$$(P^1-S^1-X^1)_{n1}-MG-(X^2-S^2-P^2)_{n2} \quad \text{Chemical Formula A}$$

In Chemical Formula A,

MG is a rod-shaped mesogenic group, $X^1$ and $X^2$ are each independently a single bond, —O—, —S—, —C(=O)—, —C(=O)O—, —(O=C)O—, —O(C=O)O—, any one of the following groups (a) to (k), or a combination thereof,

 (a)

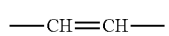 (b)

-continued

—C≡C— (c)

—CH=N— (d)

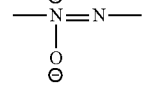 (e)

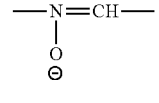 (f)

—CH=C=CH— (g)

—CH=C=N— (h)

—N=C=N— (i)

 (j)

 (k)

$S^1$ and $S^2$ are each independently a single bond or a substituted or unsubstituted C1 to C30 spacer group, $P^1$ and $P^2$ are each independently a polymerizable functional group, and $n^1$ and $n^2$ are each independently 0 or 1, provided that $n^1$ and $n^2$ are not simultaneously 0.

For example, the MG of the Chemical Formula A may include at least one of a substituted or unsubstituted aryl group or arylene group, a substituted or unsubstituted heteroaryl group or heteroarylene group, a substituted or unsubstituted cycloalkyl group or cycloalkylene group, a substituted or unsubstituted heterocycloalkyl group or heterocycloalkylene group, an acetylenylene group (—C≡C—), allenylene group (—C=C=C—), or a combination thereof.

For example, the MG of the Chemical Formula A may be represented by the following Chemical Formula B, but is not limited thereto.

$$\text{-}(A^1\text{-}Z^1)_m\text{-}A^2\text{-}Z^2\text{-}A^3\text{-} \quad \text{Chemical Formula B}$$

In Chemical Formula B, $A^1$, $A^2$, and $A^3$ are each independently a substituted or unsubstituted 1,4-phenylene group, a substituted or unsubstituted 1,4-cyclohexylene group, a substituted or unsubstituted 1,4-cyclohexenylene group, or a substituted or unsubstituted naphthalene-2,6-diyl, $Z^1$ and $Z^2$ are each independently a single bond, —O—, —S—, —C(=O)—, —C(=O)O—, —(O=C)O—, —O(C=O)O—, —(CH$_2$)$_{p1}$—, —O(CH$_2$)$_{p2}$—, —(CH$_2$)$_{p3}$O—, —CH=CH—, —C≡C—, —CH=CH—C(=O)O—, —(O=C)O—CH=CH—, or a combination thereof, wherein p1, p2, and p3 are each independently 1 to 12, and m is 0, 1, or 2.

For example, the $S^1$ and $S^2$ of the Chemical Formula A are each independently a single bond or a substituted or unsubstituted C1 to C20 alkylene group, but are not limited thereto.

For example, the $P^1$ and $P^2$ of the Chemical Formula A are each independently $CH_2=CH-C(=O)O-$, $CH_2=CCH_3-C(=O)O-$, $CH_2=CCl-C(=O)O-$, $CH_2=CH-O-$, $C(CH_3)H=CH-O-$, $CHCl=CH-O-$, $CH_2=CH-Ph-$, $CH_2=CH-Ph-O-$ (wherein Ph is a substituted or unsubstituted phenylene ($C_6H_4$) group), or a combination thereof, but are not limited thereto.

The reactive mesogen liquid crystal is exposed to heat or light to react the polymerizable functional group. Herein, the light may be, for example, ultraviolet light having a wavelength ranging from about 250 nanometers (nm) to about 400 nm.

The liquid crystal may be one kind of a liquid crystal or a mixture of two or more kinds of liquid crystals.

The liquid crystal may be included in an amount of about 5 to about 50 percent by weight (wt %) based on the total amount of the composition. Within the range, it may be included in an amount of about 5 to about 40 wt % or about 10 to about 30 wt %. While not wishing to be bound by a theory, it is understood that when the liquid crystal is included within the above ranges, optical properties of the optical film may be more effectively ensured.

The silane or germane compound may be a monomer including at least one fluorine at a terminal end thereof, for example a silane coupling agent.

The silane or germane compound may be, for example, a compound represented by the following Chemical Formula 1.

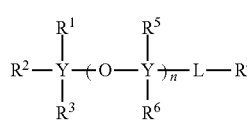

Chemical Formula 1

In Chemical Formula 1,
Y is Si or Ge;
$R^1$ to $R^3$, $R^5$, and $R^6$ are each independently hydrogen, a substituted or unsubstituted C1 to C20 alkyl group, a substituted or unsubstituted C6 to C30 aryl group, a substituted or unsubstituted C1 to C20 alkoxy group, a substituted or unsubstituted C2 to C20 alkoxyalkyl group, a substituted or unsubstituted C2 to C20 alkanoyl group, a substituted or unsubstituted C2 to C20 alkanoyloxy group, a substituted or unsubstituted C2 to C20 alkanoylalkyl group, a substituted or unsubstituted C2 to C20 alkanoyloxyalkyl group, a hydroxy group, or a combination thereof, L is a single bond, a substituted or unsubstituted C1 to C12 alkylene group, a substituted or unsubstituted C1 to C12 heteroalkylene group, a substituted or unsubstituted C7-C30 alkylarylene group, or a substituted or unsubstituted C7-C30 arylalkylene group, $R^4$ is fluorine, C1 to C3 fluoroalkyl group or C1 to C3 fluoroalkoxy group, and
n is 0 to 4.

For example, the $R^1$ to $R^3$, $R^5$, and $R^6$ may each independently be a substituted or unsubstituted C1 to C20 alkyl group or a substituted or unsubstituted C1 to C20 alkoxy group. For example, the $R^1$ to $R^3$ may each independently be a methyl group, an ethyl group, a propyl group, a methoxy group, an ethoxy group, or a propoxy group. For example, the alkyl group or the alkoxy group may not be substituted with fluorine.

For example, the L may be a substituted or unsubstituted C1 to C12 alkylene group. For example, the L may be a methylene group, an ethylene group, a propylene group, a butylene group, a pentylene group, or a hexylene group. For example, the alkylene group may not be substituted with fluorine.

For example, the $R^4$ may be a monofluoromethyl group, a difluoromethyl group, or a trifluoromethyl group.

The silane or germane compound represented by the Chemical Formula 1 includes a fluorine-containing moiety at a terminal end thereof. Thus, the silane or germane compound represented by the Chemical Formula 1 may display good affinity or anti-affinity to a substrate due to the fluorine-containing moiety, and may be homeotropically aligned on the substrate. Herein, the substrate may be, for example, a glass substrate, a metal substrate, a semiconductor substrate, or a polymer substrate, and the polymer substrate may be, for example, a substrate made of polyethylene terephthalate (PET), polyvinyl alcohol (PVA), polycarbonate (PC), triacetyl cellulose (TAC), a derivative thereof, and/or a combination thereof.

For example, when the substrate is a glass having high surface energy, the fluorine-containing moiety of the silane or germane compound displays anti-affinity to the substrate, and thus the fluorine-containing moiety may be homeotropically aligned on the opposite side of the substrate, that is, on the outside (air side). For example, when the substrate is a polymer substrate having low surface energy, the fluorine-containing moiety of the silane or germane compound displays affinity to the substrate and may be homeotropically aligned on the substrate.

In this way, the silane or germane compound may be aligned in a homeotropic direction on the surface of the substrate, and thus may be present side by side among the homeotropic liquid crystals and support and fortify the alignment of the homeotropic liquid crystals. Accordingly, homeotropicity of the liquid crystals on the substrate may be secured without a separate alignment layer.

In the Chemical Formula 1, n may be 0 to 4. For example, in the Chemical Formula 1, n may be 0, 1, 2, 3, or 4. When n is 0, the silane or germane compound represented by the Chemical Formula 1 is represented by the Chemical Formula 2:

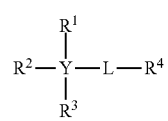

Chemical Formula 2

In Chemical Formula 2, groups Y, $R_1$, $R_2$, $R_3$, and $R_4$ are the same as defined in the Chemical Formula 1.

When Y is silicon, the compound represented by the Chemical Formula 2 is represented by the Chemical Formula 3:

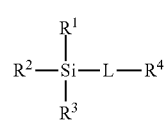

Chemical Formula 3

In Chemical Formula 3, groups $R_1$, $R_2$, $R_3$, and $R_4$ are the same as they are defined in the Chemical Formula 1.

The silane compound including at least one fluorine at a terminal end thereof may be a fluorinated cyclotrisiloxane compound selected from a fluorinated cyclotrisiloxane having one fluorinated group represented by the following Chemical Formula 4, a fluorinated cyclotrisiloxane having two fluorinated groups represented by the following Chemical Formula 5, and a fluorinated cyclotrisiloxane having three fluorinated groups represented by the following Chemical Formula 6:

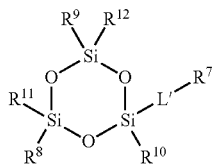

Chemical Formula 4

In Chemical Formula 4, $R^7$ has the same definition as $R^4$ in Chemical Formula 1; $R^8$ to $R^{12}$ have the same definition as $R^1$ to $R^3$ in Chemical Formula 1; and L' has the same definition as L in Chemical Formula 1.

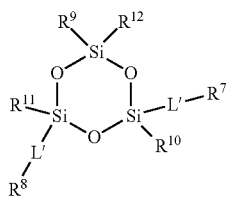

Chemical Formula 5

In Chemical Formula 5, $R^7$ and $R^8$ have the same definition as $R^4$ in Chemical Formula 1; $R^9$ to $R^{12}$ have the same definition as $R^1$ to $R^3$ in Chemical Formula 1; and L' has the same definition as L in Chemical Formula 1.

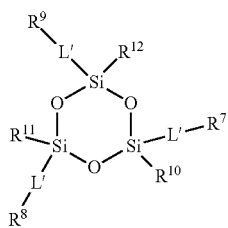

Chemical Formula 6

In Chemical Formula 6, $R^7$ to $R^9$ have the same definition as $R^4$ in Chemical Formula 1; $R^{10}$ to $R^{12}$ have the same definition as $R^1$ to $R^3$ in Chemical Formula 1; and L' has the same definition as L in Chemical Formula 1.

The silane or germane compound may include, for example, (3,3,3-trifluoropropyl)trimethoxysilane, (3,3,3-Trifluoropropyl)methyldichlorosilane, (3,3,3-trifluoropropyl)methyldimethoxysilane, (3,3,3-trifluoropropyl)methyldiethoxysilane, (3,3,3-trifluoropropyl)trichlorosilane, or (3,3,3-trifluoropropyl)triethoxysilane.

The silane or germane compound may be included in an amount of about 0.1 to about 5 wt % based on the total amount of the composition. Within the above range, the silane or germane compound may be included in an amount of about 0.1 to about 3 wt % or about 0.1 to about 1.1 wt %. While not wishing to be bound by a theory, it is understood that when the silane or germane compound is included within the above ranges, alignment of the homeotropic liquid crystals may be more effectively supported and fortified.

The polymerizable compound may be a photopolymerizable monomer, a photopolymerizable oligomer, a thermally polymerizable monomer, and/or a thermally polymerizable oligomer capable of participating in a polymerization reaction by light or heat. The polymerizable compound may be any compound having at least one polymerizable functional group without particular limitation, and may include, for example, an acryloxy group, a methacryloxy group, an acryloyl group, a methacryloyl group, a vinyl group, a vinyloxy group, an epoxy group, or a combination thereof. For example, the polymerizable compound may include $CH_2=CH-C(=O)O-$, $CH_2=CCH_3-C(=O)O-$, $CH_2=CCl-C(=O)O-$, $CH_2=CH-O-$, $C(CH_3)H=CH-O-$, $CHCl=CH-O-$, $CH_2=CH-Ph-$, $CH_2=CH-Ph-O-$ (where Ph is a substituted or unsubstituted phenylene ($C_6H_4$) group), or a combination thereof, but is not limited thereto.

For example, the polymerizable compound may have an acryloyl or an acryloxy group at a terminal end thereof, for example, 4 to 10 acryloyl or acryloxy groups.

The polymerizable compound may be, for example, a compound represented by the following Chemical Formula C, but is not limited thereto.

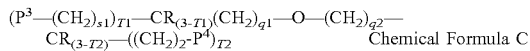

Chemical Formula C

In Chemical Formula C,
R is hydrogen or a methyl group,
$P^3$ and $P^4$ are each independently a polymerizable functional group, for example, $CH_2=CH-C(=O)O-$, $CH_2=CCH_3-C(=O)O-$, $CH_2=CCl-C(=O)O-$, $CH_2=CH-O-$, $C(CH_3)H=CH-O-$, $CHCl=CH-O-$, $CH_2=CH-Ph-$, $CH_2=CH-Ph-O-$ (where Ph is a substituted or unsubstituted phenylene ($C_6H_4$) group), or a combination thereof,
S1, S2, q1, and q2 are each independently 0 or 1, and
T1 and T2 are each independently 2 or 3.

The polymerizable compound may react upon exposure to light or heat, and the light may be, for example, ultraviolet light having a wavelength of about 250 nm to about 400 nm.

A polymer obtained through the reaction of the polymerizable compound may fortify a bonding force among the homeotropic liquid crystals, between the substrate and the homeotropic liquid crystals, and between the homeotropic liquid crystals and the silane or germane compound, and may play a role of a matrix supporting and fixing the homeotropic liquid crystals. Accordingly, the polymerizable compound may support and fortify alignment of the homeotropic liquid crystals on the substrate, and thus may be used along with the silane or germane compound to secure the homeotropic alignment of the liquid crystals without a separate alignment layer.

The polymerizable compound may be included in an amount of about 0.1 to about 10 wt % based on the total amount of the composition. Within the range, it may be included in an amount of about 0.5 to about 10 wt % or about 1 to about 10 wt %. While not wishing to be bound by a theory, it is understood that when the polymerizable compound is included within the above ranges, it is used with the silane or germane compound to support or fortify alignment of the homeotropic liquid crystals more effectively.

For example, the homeotropic liquid crystal, the silane or germane compound, and the polymerizable compound may be included in each amount of about 5 to about 50 wt %, about 0.1 to about 5 wt %, and about 0.1 to about 10 wt %, respectively, based on the total amount of a solid content.

For example, the homeotropic liquid crystal, the silane or germane compound, and the polymerizable compound may be included in each amount of about 5 to about 50 wt %, about 0.1 to about 3 wt %, and about 1 to about 10 wt %, respectively, based on the total amount of a solid content.

For example, the homeotropic liquid crystal, the silane or germane compound, and the polymerizable compound may be included in each amount of about 5 to about 50 wt %, about 0.1 to about 1.1 wt %, and about 1 to about 10 wt %, respectively, based on the total amount of a solid content.

The composition may further include a reaction initiator. The reaction initiator may be, for example, a thermal initiator or a photoinitiator such as a free radical photoinitiator and/or an ionic photoinitiator. A thermal initiator can be an azo compound such as 4,4-azobis(4-cyanovaleric acid), 1,1'-azobis(cyclohexanecarbonitrile), or 2,2'-azobisisobutyronitrile (AIBN); an inorganic peroxide such as ammonium persulfate, hydroxymethanesulfinic acid monosodium salt dehydrate, and sodium or potassium persulfate; and an organic peroxide such as benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, and peracetic acid, but is not limited thereto. A photoinitiator can be benzoin and its derivatives such as benzoin ethyl ether, benzoin isobutyl ether, or benzoin methyl ether; a benzyl ketal; acetophenone and its derivatives such as 2,2-diethoxyacetophenone, 2,2-dimethoxy-2-phenylacetophenone, 4'-ethoxyacetophenone, 3'-hydroxyacetophenone, 4'-hydroxyacetophenone; benzophenone and its derivatives such as 3-hydroxybenzophenone, 4-hydroxybenzophenone, 4'-phenoxyacetophenone; an acylphosphine oxide, such as diphenyl(2,4,6-trimethylbenzoyl)phosphine oxide, but are not limited thereto.

The reaction initiator may be included in an amount of about 0.01 to 5 wt % based on the total amount of the composition. Within the above range, it may be included in an amount of about 0.1 to about 4 wt % or about 0.1 to about 2 wt %. While not wishing to be bound by a theory, it is understood that when the reaction initiator is included within the above ranges, the reaction may be effectively initiated.

The composition may further include an additive. The additive may be a surfactant, a dissolution aid, and/or a dispersing agent, but is not limited thereto.

The composition may further include a solvent that may dissolve and/or disperse the above components. The solvent may dissolve and/or disperse the above components, and may not be particularly limited as long as it does not cause physical or chemical damage to the substrate. The solvent may be, for example, at least one selected from deionized water, methanol, ethanol, propanol, isopropanol, 2-methoxyethanol, 2-ethoxyethanol, 2-propoxyethanol, 2-butoxyethanol, methylcellosolve, ethylcellosolve, butylcellosolve, diethylene glycol methyl ether, diethylene glycol ethyl ether, dipropylene glycol methyl ether, toluene, xylene, hexane, heptane, octane, ethyl acetate, butyl acetate, diethylene glycol dimethyl ether, diethylene glycol dimethyl ethyl ether, methyl ethoxy propionate, ethyl ethoxy propionate, ethyl lactate, propylene glycol methyl ether acetate, propylene glycol methyl ether, propylene glycol propyl ether, methyl cellosolve acetate, ethyl cellosolve acetate, diethylene glycol methyl ether acetate, diethylene glycol ethyl ether acetate, acetone, methyl ethyl ketone, methyl isobutyl ketone, cyclopentanone, cyclohexanone, dimethyl formamide (DMF), N,N-dimethyl acetamide (DMAc), N-methyl-2-pyrrolidone, γ-butyrolactone, diethyl ether, ethylene glycol dimethyl ether, diglyme, tetrahydrofuran, acetylacetone, acetonitrile, chloroform, dichloromethane, tetrachloroethane, trichloroethylene, tetrachloroethylene, chlorobenzene, and benzene. The solvent may be a single solvent or a mixed solvent.

The solvent may be included in a balance amount other than the above components based on the total amount of the composition.

The composition may be applied on the substrate to form a layer, and the layer may be dried to prepare a film.

The substrate may be, for example, a glass substrate, a metal substrate, a semiconductor substrate, or a polymer substrate, and the polymer substrate may be, for example, a substrate made of polyethylene terephthalate (PET), polyvinyl alcohol (PVA), polycarbonate (PC), triacetyl cellulose (TAC), a derivative thereof, and/or a combination thereof.

The composition may be, for example, applied using a solution process such as spin coating, slit coating, and/or inkjet coating, and may control a thickness considering a refractive index of the film.

The applied composition may be, for example, dried at a temperature that is greater than the boiling point of the solvent.

As described above, the composition includes the silane or germane compound and the polymerizable compound, and thereby alignment of the homeotropic liquid crystal may be established and fortified without an alignment layer. Therefore, a process of manufacturing the film may be simplified and alignment uniformity of an alignment layer may be established regardless of a surface state, and thus good optical properties of the optical film may be realized.

Hereinafter, an optical film formed using the composition is described referring to the drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
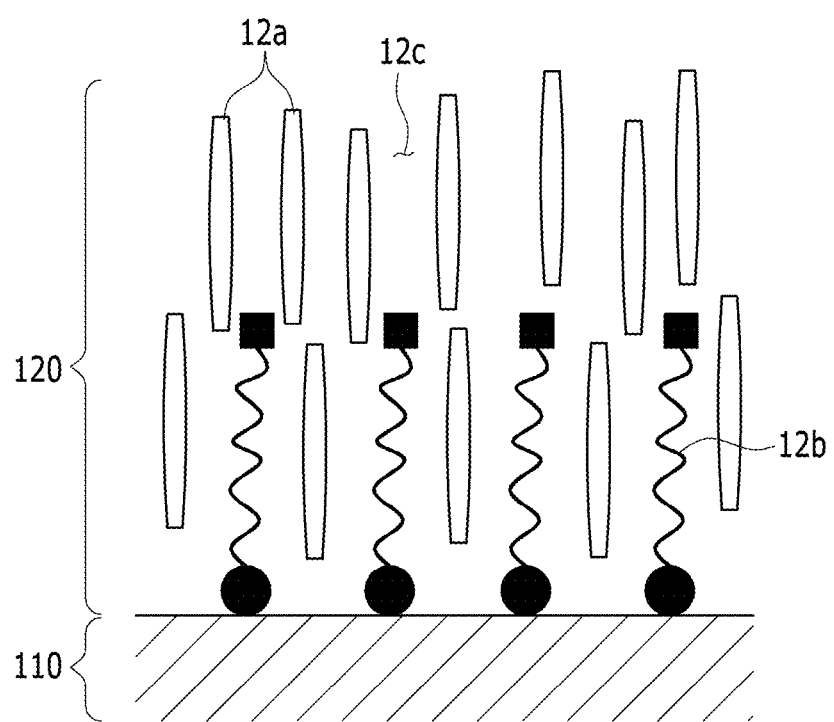

FIGS. 1 and 2 are cross-sectional views of optical films according to an embodiment.

Referring to FIGS. 1 and 2, an optical film 100 according to an embodiment includes a substrate 110 and liquid crystal layer 120 positioned on the substrate 110.

The substrate 110 may include, for example, a glass substrate, a metal substrate, a semiconductor substrate, or a polymer substrate. The polymer substrate may be, for example, a substrate made of polyethylene terephthalate (PET), polyvinyl alcohol (PVA), polycarbonate (PC), triacetyl cellulose (TAC), a derivative thereof, and/or a combination thereof, but is not limited thereto. When the optical film 100 includes another lower layer (not shown) in addition to the substrate, the substrate 110 may be the lower layer.

The liquid crystal layer 120 includes a liquid crystal 12a, a silane or germane compound 12b including at least one fluorine at a terminal end thereof, and a polymer 12c.

The liquid crystal 12a may be a rod-shaped monomer, oligomer, and/or a polymer, and may be a homeotropic liquid crystal where a long-axis direction of the liquid crystal 12a is arranged in a direction perpendicular to the surface of the substrate 110.

The liquid crystal 12a may be a reactive mesogen liquid crystal, for example, a reactive mesogen liquid crystal having at least one polymerizable functional group and/or a resulting polymerization product thereof.

The reactive mesogen liquid crystal may include at least one of, for example, a rod-shaped aromatic derivative having at least one polymerizable functional group, 1-methyl propylene glycol, propylene glycol 2-acetate, and a compound represented by $P^1$-$A^1$-$(Z^1$-$A^2)_n$-$P^2$ (wherein $P^1$ and $P^2$ are a polymerizable functional group and may be independently acryloxy, methacryloxy, acryloyl, methacryloyl, vinyl, vinyloxy, epoxy, or a combination thereof, $A^1$ and $A^2$ are each independently 1,4-phenylene, a naphthalene-2,6-diyl group, or a combination thereof, $Z^1$ includes a single bond, —O—, —S—, —C(=O)—, —C(=O)O—, —(O=C)O—, —O(C=O)O—, or a combination thereof, or n is 0, 1, or 2), but is not limited thereto.

The reactive mesogen liquid crystal may be, for example, a compound represented by the following Chemical Formula A.

$$(P^1\text{—}S^1\text{—}X^1)_{n1}\text{-MG-}(X^2\text{—}S^2\text{—}P^2)_{n2}$$ Chemical Formula A In Chemical Formula A, MG is a rod-shaped mesogen group, $X^1$ and $X^2$ are each independently a single bond, —O—, —S—, —C(=O)—, —C(=O)O—, —(O=C)O—, —OC(=O)O—, any one of the following groups (a) to (k), or a combination thereof,

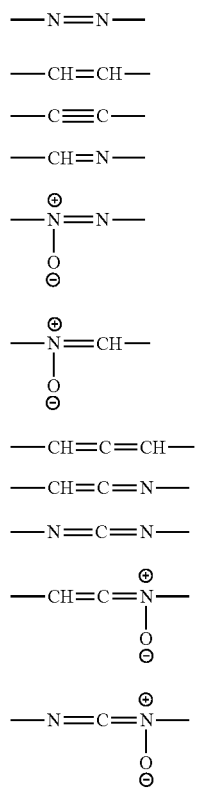

(a) —N=N—
(b) —CH=CH—
(c) —C≡C—
(d) —CH=N—
(e) —N⊕=N— | O⊖
(f) —N⊕=CH— | O⊖
(g) —CH=C=CH—
(h) —CH=C=N—
(i) —N=C=N—
(j) —CH=C=N⊕— | O⊖
(k) —N=C=N⊕— | O⊖

$S^1$ and $S^2$ are each independently a single bond or a substituted or unsubstituted C1 to C30 spacer group, $P^1$ and $P^2$ are each independently a polymerizable functional group, and $n^1$ and $n^2$ are each independently 0 or 1, provided that $n^1$ and $n^2$ are not simultaneously 0.

For example, the MG of the Chemical Formula A may include at least one of a substituted or unsubstituted aryl group or arylene group, a substituted or unsubstituted heteroaryl group or heteroarylene group, a substituted or unsubstituted cycloalkyl group or cycloalkylene group, a substituted or unsubstituted heterocycloalkyl group or heterocycloalkylene group, or a combination thereof.

For example, the MG of the Chemical Formula A may be represented by the following Chemical Formula B, but is not limited thereto.

$$\text{-}(A^1\text{-}Z^1)_m\text{-}A^2\text{-}Z^2\text{-}A^3\text{-}$$ Chemical Formula B In Chemical Formula B, $A^1$, $A^2$, and $A^3$ are each independently a substituted or unsubstituted 1,4-phenylene group, a substituted or unsubstituted 1,4-cyclohexylene group, a substituted or unsubstituted 1,4-cyclohexenylene group, or a substituted or unsubstituted naphthalene-2,6-diyl, $Z^1$ and $Z^2$ are each independently a single bond, —O—, —S—, —C(=O)—, —C(=O)O—, —(O=C)O—, —O(C=O)O—, —(CH$_2$)$_{p1}$—, —O(CH$_2$)$_{p2}$—, —(CH$_2$)$_{p3}$O—, —CH=CH—, —C≡C—, —CH=CH—C(=O)O—, —(O=C)O—CH=CH—, or a combination thereof, wherein p1, p2, and p3 are each independently 1 to 12, and m is 0, 1, or 2.

For example, the $S^1$ and $S^2$ of the Chemical Formula A are each independently a single bond or a substituted or unsubstituted C1 to C20 alkylene group, but are not limited thereto.

For example, the $P^1$ and $P^2$ of the Chemical Formula A are each independently CH$_2$=CH—C(=O)O—, CH$_2$=CCH$_3$—C(=O)O—, CH$_2$=CCl—C(=O)O—, CH$_2$=CH—O—, C(CH$_3$)H=CH—O—, CHCl=CH—O—, CH$_2$=CH-Ph-, CH$_2$=CH-Ph-O— (where Ph is a substituted or unsubstituted phenylene (C$_6$H$_4$) group), or a combination thereof, but are not limited thereto.

The liquid crystal 12a may be one kind of a liquid crystal or a mixture of two or more kinds of liquid crystals.

The silane or germane compound 12b may be a monomer including at least one fluorine at a terminal end thereof, for example a silane coupling agent or a germane coupling agent.

The silane or germane compound 12b may be, for example, a compound represented by the following Chemical Formula 1.

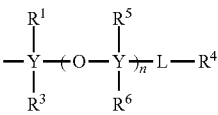

Chemical Formula 1

In Chemical Formula 1,

Y is Si or Ge;

$R^1$ to $R^3$, $R^5$, and $R^6$ are each independently hydrogen, a substituted or unsubstituted C1 to C20 alkyl group, a substituted or unsubstituted C6 to C30 aryl group, a substituted or unsubstituted C1 to C20 alkoxy group, a substituted or unsubstituted C2 to C20 alkoxyalkyl group, a substituted or unsubstituted C2 to C20 alkanoyl group, a substituted or unsubstituted C2 to C20 alkanoyloxy group, a substituted or unsubstituted C2 to C20 alkanoylalkyl group, a substituted or unsubstituted C2 to C20 alkanoyloxyalkyl group, a hydroxy group, or a combination thereof, L is a single bond, a substituted or unsubstituted C1 to C12 alkylene group, a substituted or unsubstituted C1 to C12 heteroalkylene group, a substituted or unsubstituted C7-C30 alkylarylene group, or a substituted or unsubstituted C7-C30 arylalkylene group, $R^4$ is fluorine, C1 to C3 fluoroalkyl group or C1 to C3 fluoroalkoxy group, and n is 0 to 4.

In the Chemical Formula 1, n may be 0 to 4. For example, in the Chemical Formula 1, n may be 0, 1, 2, 3, or 4. When n is 0, the silane or germane compound represented by the Chemical Formula 1 is represented by the Chemical Formula 2:

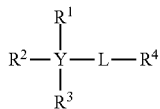

Chemical Formula 2 wherein in the Chemical Formula 2, groups Y, $R_1$, $R_2$, $R_3$, and $R_4$ are the same as defined in the Chemical Formula 1.

When Y is silicon, the compound represented by the Chemical Formula 2 is represented by the Chemical Formula 3:

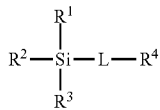

Chemical Formula 3 wherein in the Chemical Formula 3, groups $R_1$, $R_2$, $R_3$, and $R_4$ are the same as they are defined in the Chemical Formula 1.

For example, the $R^1$ to $R^3$, $R^5$, and $R^6$ may each independently be a substituted or unsubstituted C1 to C20 alkyl group or a substituted or unsubstituted C1 to C20 alkoxy group. For example, the $R^1$ to $R^3$ may each independently be a methyl group, an ethyl group, a propyl group, a methoxy group, an ethoxy group, or a propoxy group. For example, the alkyl group or the alkoxy group may not be substituted with fluorine.

For example, the L may be a substituted or unsubstituted C1 to C12 alkylene group. For example, the L may be a methylene group, an ethylene group, a propylene group, a butylene group, a pentylene group, or a hexylene group. For example, the alkylene group may not be substituted with fluorine.

For example, the $R^4$ may be a monofluoromethyl group, a difluoromethyl group, or a trifluoromethyl group.

The silane compound including at least one fluorine at a terminal end thereof may be a fluorinated cyclotrisiloxane compound selected from a fluorinated cyclotrisiloxane having one fluorinated group represented by the following Chemical Formula 4, a fluorinated cyclotrisiloxane having two fluorinated groups represented by the following Chemical Formula 5, and a fluorinated cyclotrisiloxane having three fluorinated groups represented by the following Chemical Formula 6:

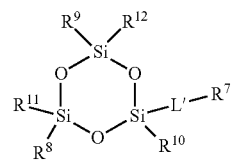

Chemical Formula 4

In Chemical Formula 4, $R^7$ has the same definition as $R^4$ in Chemical Formula 1; $R^8$ to $R^{12}$ have the same definition as $R^1$ to $R^3$ in Chemical Formula 1; and L' has the same definition as L in Chemical Formula 1.

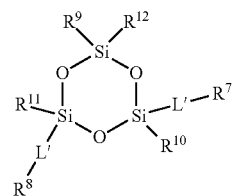

Chemical Formula 5

In Chemical Formula 5, $R^7$ and $R^8$ have the same definition as $R^4$ in Chemical Formula 1; $R^9$ to $R^{12}$ have the same definition as $R^1$ to $R^3$ in Chemical Formula 1; and L' has the same definition as L in Chemical Formula 1.

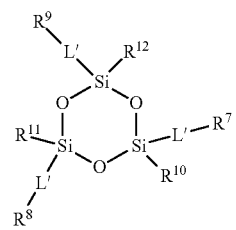

Chemical Formula 6

In Chemical Formula 6, $R^7$ to $R^9$ have the same definition as $R^4$ in Chemical Formula 1; $R^{10}$ to $R^{12}$ have the same definition as $R^1$ to $R^3$ in Chemical Formula 1; and L' has the same definition as L in Chemical Formula 1.

The silane or germane compound 12b includes a fluorine-containing moiety at its end, and displays affinity or anti-affinity to the substrate 110 due to the fluorine-containing moiety, and thus may be homeotropically aligned.

Referring to FIG. 2, the fluorine-containing moiety of the silane or germane compound 12b may be marked as ● or ■. For example, when the substrate 110 is a glass, the fluorine-containing moiety (■) of the silane or germane compound 12b displays anti-affinity to the substrate 110 and may be homeotropically aligned on the opposite side of the substrate 110, that is, on the outside (air side). For example, when the substrate 110 is a hydrophobic polymer substrate, the fluorine-containing moiety (●) of the silane or germane compound 12b has affinity with the substrate 110, and thus may be homeotropically aligned on the substrate 110.

Accordingly, as shown in FIG. 2, the liquid crystals 12a may be aligned in a substantially perpendicular direction with respect to the surface of the substrate 110 and may be substantially parallel to the silane or germane compound 12b.

In this way, the silane or germane compound 12b may be aligned in a perpendicular direction with respect to the surface of the substrate 110 as a result of affinity between the substrate 110 and the fluorine-containing moiety (●) or anti-affinity with the substrate 110 and the fluorine-containing moiety (■). Accordingly, the silane or germane compound 12b is aligned parallel to the liquid crystals 12a among the liquid crystals 12a, and thus may support and fortify alignment of the liquid crystals 12a. As a result, the homeotropic alignment of the liquid crystals 12a on the substrate 110 may be secured without a separate alignment layer.

The polymer 12c may be a reaction product with a polymerizable compound including a photopolymerizable monomer, a photopolymerizable oligomer, a thermally polymerizable monomer, and/or a thermally polymerizable oligomer capable of participating in a polymerization reaction initiated by light or heat.

The polymerizable compound may be any compound having at least one polymerizable functional group without particular limitation, and may include, for example an acryloxy group, a methacryloxy group, an acryloyl group, a methacryloyl group, a vinyl group, a vinyloxy group, an epoxy group, or a combination thereof, for example $CH_2=CH-C(=O)O-$, $CH_2=CCH_3-C(=O)O-$, $CH_2=CCl-C(=O)O-$, $CH_2=CH-O-$, $C(CH_3)H=CH-O-$, $CHCl=CH-O-$, $CH_2=CH-Ph-$, $CH_2=CH-Ph-O-$ (where -Ph- is a substituted or unsubstituted phenylene ($C_6H_4$) group), or a combination thereof, but is not limited thereto.

For example, the polymerizable compound may have an acryloyl group or an acryloxy group at a terminal end thereof, for example 4 to 10 acryloyl or acryloxy groups.

The polymerizable compound may be, for example, a compound represented by the following Chemical Formula C, but is not limited thereto.

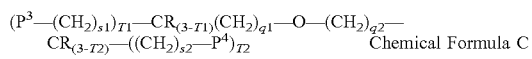
Chemical Formula C

In Chemical Formula C,
R is hydrogen or a methyl group,
$P^3$ and $P^4$ are each independently a polymerizable functional group, for example $CH_2=CH-C(=O)O-$, $CH_2=CCH_3-C(=O)O-$, $CH_2=CCl-C(=O)O-$, $CH_2=CH-O-$, $C(CH_3)H=CH-O-$, $CHCl=CH-O-$, $CH_2=CH-Ph-$, $CH_2=CH-Ph-O-$ (where Ph is a substituted or unsubstituted phenylene ($C_6H_4$) group), or a combination thereof,
S1, S2, q1, and q2 are each independently 0 or 1, and
T1 and T2 are each independently 2 or 3.

The polymer 12c may be present as a matrix and fortify a bonding force among the liquid crystals 12a, between the substrate 110 and the liquid crystals 12a, and between the liquid crystals 12a and the silane or germane compounds 12b. Accordingly, the polymer 12c may support and fortify alignment of the liquid crystals 12a on the substrate 110, and thus is used along with the silane or germane compound 12b. As a result, the polymer 12c may secure homeotropicity of the liquid crystals 12a on the substrate 110 without a separate alignment layer.

The liquid crystal 12a of the liquid crystal layer 120 may have homeotropicity where the liquid crystals 12a are arranged in a perpendicular direction with respect to the surface of the substrate 110 as described above. In addition, the liquid crystal layer 120 may have in-plane phase retardation ($R_0$) of about 0 nm≤$R_0$≤about 1 nm for incident light in a 550 nm wavelength (hereinafter referred to as "reference wavelength"). Herein, the in-plane phase retardation ($R_0$) may be represented by $R_0=(n_x-n_y)d$, wherein $n_x$ is a refractive index in a direction having the highest in-plane phase refractive index of the liquid crystal layer 120 (hereinafter referred to as "slow axis"), $n_y$ is a refractive index in a direction having the lowest in-plane phase refractive index of the liquid crystal layer (hereinafter referred to as "fast axis"), and d is a thickness of the liquid crystal layer 120. The in-plane phase retardation ($R_0$) may be in the range of about 0 nm≤$R_0$≤about 0.5 nm, and may be substantially about 0.

On the other hand, the retardation may have thickness direction retardation ($R_{th}$) in addition to the in-plane phase retardation ($R_0$). The thickness direction retardation ($R_{th}$) of the liquid crystal layer 120 is retardation generated in a thickness direction, which may be represented by $R_{th}=\{[(n_x+n_y)/2]-n_z\}d$, wherein $n_x$ is a refractive index at a slow axis of the liquid crystal layer 120, $n_y$ is a refractive index at a fast axis of the liquid crystal layer 120, $n_z$ is a refractive index in a direction perpendicular to $n_x$ and $n_y$, and d is a thickness of the liquid crystal layer 120. The absolute value of the thickness direction retardation ($R_{th}$) of the liquid crystal layer 120 may be in the following range: about 50 nm≤$R_{th}$≤about 300 nm.

The liquid crystal layer 120 may have a refractive index satisfying the following Relationship Equation 1.

$$n_z > n_x = n_y$$  Relationship Equation 1

In the Relationship Equation 1,
$n_x$ is a refractive index at a slow axis of the liquid crystal layer 120,
$n_y$ is a refractive index at a fast axis of the liquid crystal layer 120, and
$n_z$ is a refractive index in a direction perpendicular to the slow axis and the fast axis of the liquid crystal layer 120.

The optical film 100 may be used alone or may be stacked with another film having a different refractive index therefrom.

Hereinafter, a compensation film according to an embodiment is described referring to FIG. 3 along with FIGS. 1 and 2.

Figure 3:
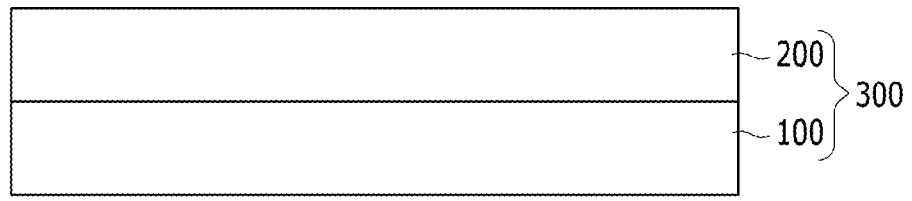
FIG. 3 is a schematic cross-sectional view showing a compensation film according to an embodiment.

FIG. 3 is a schematic cross-sectional view showing a compensation film according to an embodiment.

The compensation film 300 according to an embodiment includes the optical film 100 and a phase retardation film 200.

The optical film 100 includes the substrate 110 and the liquid crystal layer 120, as described above. The liquid crystal layer 120 includes the silane or germane compound 12b and the polymer 12c along with the liquid crystal 12a having homeotropicity. Thus, the optical film 100 may realize homeotropicity of alignment in a direction perpendicular to the surface of the substrate 110 without an alignment layer and in-plane phase isotropy in which an in-plane phase retardation ($R_0$) is substantially 0. The detailed description of the optical film 100 is the same as described above.

The phase retardation film 200 may be a monolayer or a multi-layer, and may be a film having a refractive index different from that of the optical film 100. The phase retardation film 200 may be, for example, a λ/4 phase retardation film, a λ/2 phase retardation film, or a combination thereof, but is not limited thereto. Herein the λ/4 phase retardation film may have, for example, in-plane phase retardation of about 120 nm to about 160 nm for incident light of a 550 nm wavelength, and the λ/2 phase retardation film may have, for example, in-plane phase retardation of about 240 nm to about 320 nm for incident light of a 550 nm wavelength. The phase retardation film 200 may be, for example, a positive or negative A plate, a positive or negative B plate, or a combination thereof, but is not limited thereto.

The compensation film 300 may further include an adhesion layer (not shown) between the optical film 100 and the phase retardation film 200. The adhesion layer may effectively adhere between the optical film 100 and the phase retardation film 200, and may include, for example, a pressure sensitive adhesive.

The compensation film 300 may have a refractive index different from the refractive indices of the optical film 100 and the phase retardation film 200 obtained by combining the refractive indices of the optical film 100 and the phase retardation film 200.

The compensation film 300 may be prepared to have desirable retardation by controlling each refractive index and thickness of the optical film 100 and the phase retardation film 200. For example, the optical film 100 may reduce or offset retardation of the phase retardation film 200 in a thickness direction, and thus decrease dependence on a viewing angle and a wavelength, to obtain a compensation film 300 having a fortified compensation function. This compensation film 300 may effectively realize a circularly polarized light compensation function and thus improve display characteristics of a display device.

The compensation film 300 may be obtained by respectively preparing the optical film 100 and the phase retardation film 200 and then assembling these films together; by coating the optical film 100 on the phase retardation film 200; or by coating the phase retardation film 200 on the optical film 100. The optical film 100 may be prepared by coating the aforementioned composition on the substrate 110 and photo-crosslinking them as described above. The compensation film 300 may be formed, for example, in a method of roll-to-roll, spin coating, transfer, and the like, but is not limited thereto.

Figure 4:
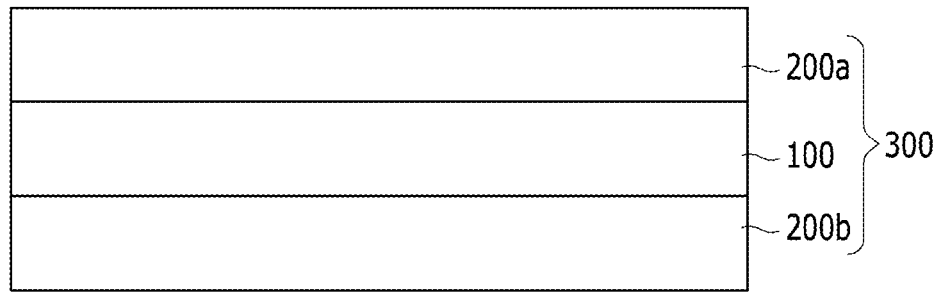
FIG. 4 is a schematic cross-sectional view showing a compensation film according to another embodiment.

FIG. 4 is a schematic cross-sectional view showing a compensation film according to another embodiment.

The compensation film 300 according to the present embodiment includes phase retardation films 200a and 200b positioned on both sides of the optical film 100, unlike the above embodiment.

The compensation film 300 may have a refractive index different from the refractive indices of the optical film 100 and the phase retardation films 200a and 200b by combining the refractive indices of the optical film 100 and the phase retardation films 200a and 200b. The compensation film 300 may be prepared to have desirable retardation by controlling each refractive index and thickness of the optical film 100 and the phase retardation films 200a and 200b.

The compensation film 300 may further include an adhesion layer (not shown) either between the optical film 100 or the phase retardation film 200a and between the optical film 100 and the phase retardation film 200b. The adhesion layer may effectively adhere between the optical film 100 and the phase retardation films 200a and 200b, and may include, for example, a pressure sensitive adhesive.

The compensation film 300 may form an anti-reflective film with a polarizer and the anti-reflective film may have an external light anti-reflection function.

Figure 5:
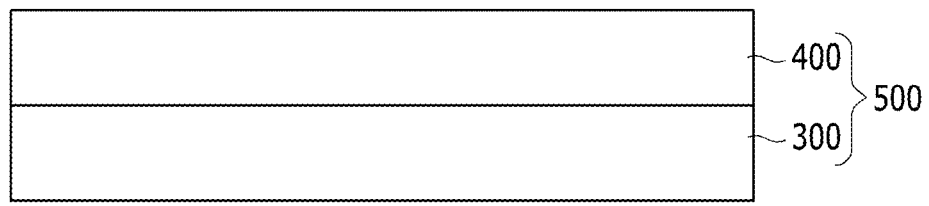
FIG. 5 is a schematic cross-sectional view showing an anti-reflective film according to an embodiment.

FIG. 5 is a schematic cross-sectional view showing an anti-reflective film according to an embodiment.

Referring to FIG. 5, an anti-reflective film 500 according to an embodiment includes a compensation film 300 and a polarizer 400 positioned on the compensation film 300.

The polarizer 400 may be positioned on the optical film 100 and may be positioned on the phase retardation film 200.

The polarizer 400 may be disposed on the side where the light enters, and may be a linear polarizer changing the incident unpolarized light into linear polarized light. The polarizer 400 may be made of, for example, elongated polyvinyl alcohol (PVA) prepared according to a method of, for example, stretching a polyvinyl alcohol film, adsorbing iodine or a dichroic dye thereto, and borating and washing the same. The polarizer 400 may be a polarizing film prepared, for example, by melt-blending a polymer resin and a dichroic dye. The polarizing film may be prepared by mixing a polymer resin and a dichroic dye and melting the polymer resin and the dichroic dye at a temperature above the melting point of the polymer resin.

The anti-reflective film 500 may further include a protective layer (not shown) on the polarizer 400. The protective layer may be provided to further reinforce the functionality or to improve the durability of the anti-reflective film 500, or to reduce reflection or glare, and for example, may be a triacetyl cellulose (TAC) film, but is not limited thereto.

The anti-reflective film 500 may further include a correction layer (not shown) positioned on one side of the compensation film 300. The correction layer may be, for example, a color shift resistant layer, but is not limited thereto.

The anti-reflective film 500 may further include a light blocking layer (not shown) extended along the edge. The light blocking layer may be formed as a strip along the circumference of the anti-reflective film 500. The light blocking layer may include an opaque material, for example, a black material. For example, the light blocking layer may be made of a black ink.

The anti-reflective film 500 may be stacked with the compensation film 300 and the polarizer 400 by a roll-to-roll method, without limitation.

Figure 6:
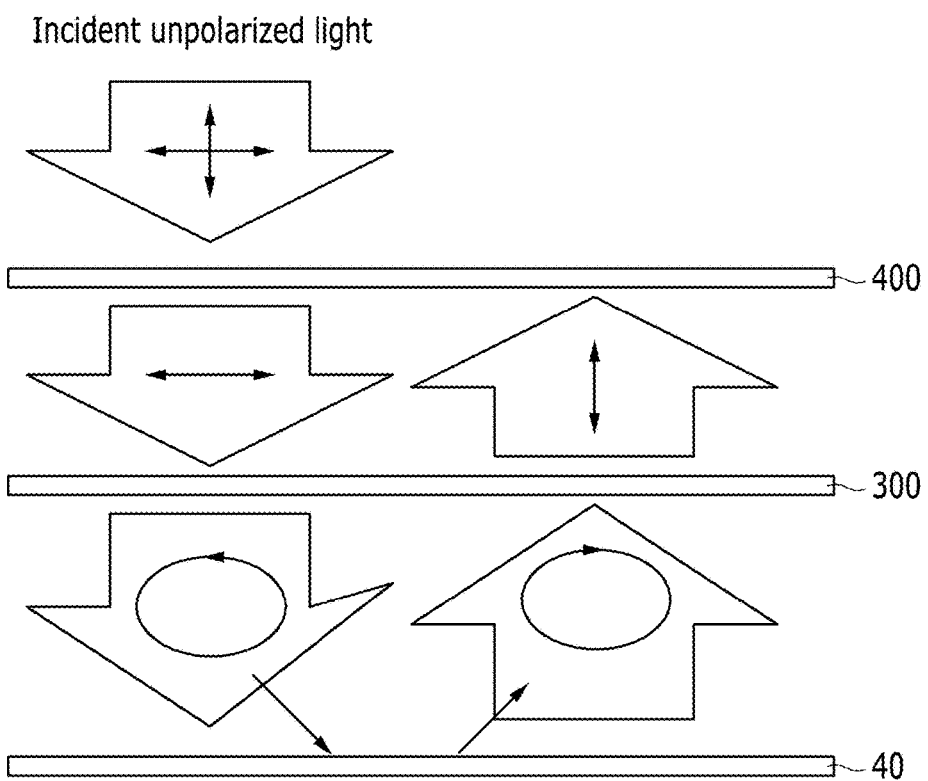
FIG. 6 is a schematic view illustrating the external light anti-reflection principle of an anti-reflective film according to an embodiment.

FIG. 6 is a schematic view showing the external light anti-reflection principle of an anti-reflective film according to an embodiment.

Referring to FIG. 6, when incident unpolarized light passes through the polarizer 400, one polarizing perpendicular component of two polarizing perpendicular components, e.g., a first polarizing component, is transmitted through the polarizer 400, while polarized light passes through the compensation film 300 and may be changed into circularly polarized light. The circularly polarized light is reflected in the display panel 40 including a substrate, an electrode, and the like, and thus the direction of the circularly polarized light is changed. When the circularly polarized light, the direction of which is changed, passes through the compensation film 300 again, the compensation film 300 transmits the other polarizing perpendicular component of the two polarizing perpendicular components, e.g., a second polarizing component, which is perpendicular to the first polarizing component. The second polarizing component may not pass through the polarizer 400 and is not transmitted out of the display device, thus effectively preventing the reflection of external light.

The optical film 100, the compensation film 300, or the anti-reflective film 500 may be applied to various display devices.

A display device according to an embodiment includes a display panel and a film positioned on one side of the display panel. The display panel may be a liquid crystal panel or an organic light emitting panel, but is not limited thereto. The film may be the optical film 100, the compensation film 300, or the anti-reflective film 500.

Hereinafter, an organic light emitting display is described as one example of a display device.

Figure 7:
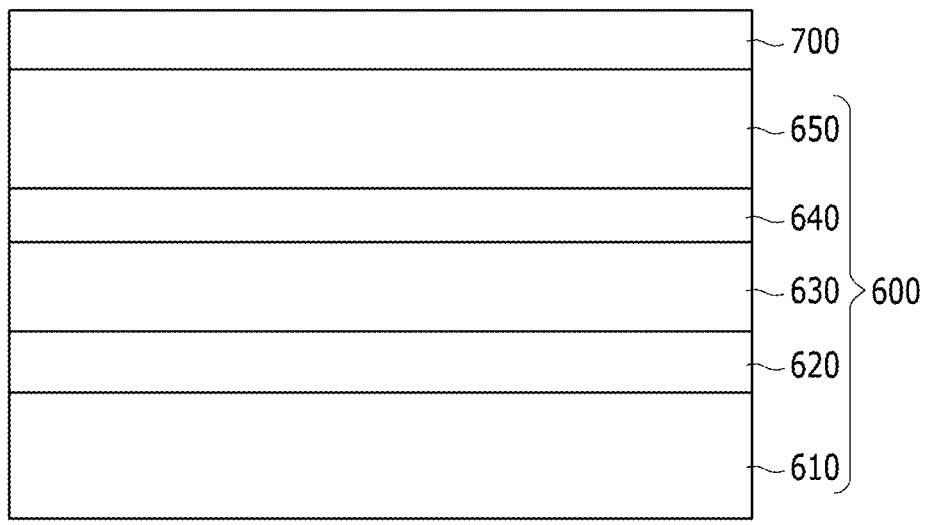
FIG. 7 is a schematic cross-sectional view showing an organic light emitting display device according to an embodiment.

FIG. 7 is a cross-sectional view showing an organic light emitting display according to an embodiment.

Referring to FIG. 7, the organic light emitting display according to an embodiment includes an organic light emitting diode panel 600 and a film 700 positioned on one side of the organic light emitting diode panel 600.

The organic light emitting diode panel 600 may include a base substrate 610, a lower electrode 620, an organic emission layer 630, an upper electrode 640, and an encapsulation substrate 650.

The base substrate 610 may be made of glass or plastic.

One of the lower electrode 620 and the upper electrode 640 may be an anode, and the other one may be a cathode. The anode is an electrode into which holes are injected, which may be made of a conductor having a high work function. The cathode is an electrode to which electrons are injected, which may be made of a conductor having a low work function. At least one of the lower electrode 620 and the upper electrode 640 may be made of a transparent conductive material, for example ITO or IZO.

The organic emission layer 630 may include an organic material which may emit light when applying a voltage to the lower electrode 620 and the upper electrode 640.

An auxiliary layer (not shown) may be further provided between the lower electrode 620 and the organic emission layer 630 and/or between the upper electrode 640 and the organic emission layer 630. The auxiliary layer may be used to balance electrons and holes, and may include a hole transport layer (HTL), a hole injection layer (HIL), an electron injection layer (EIL), and an electron transporting layer (ETL), but is not limited thereto.

The encapsulation substrate 650 may be made of glass, metal, or a polymer, and may seal the lower electrode 620, the organic emission layer 630, and the upper electrode 640 to prevent moisture and/or oxygen inflow from the outside.

The film 700 may be disposed at the side where light is emitted. In an embodiment, where the display device is a bottom emission type in which light is emitted toward the base substrate 610, the film 700 may be disposed at an outer surface of the base substrate 610. In an alternative embodiment, where the display device is a top emission type in which light is emitted toward the encapsulation substrate 650, the film 700 may be disposed at an outer surface of an encapsulation substrate 650.

The film 700 may be the optical film 100, the compensation film 300, or the anti-reflective film 500. For example, when the film 700 is an anti-reflective film 500, an external light reflected by a reflection layer such as electrodes and/or wires of the organic light emitting diode panel 600 may be prevented from transmitting out of the display device to improve display characteristics of the organic light emitting diode (OLED) display.

Hereinafter, a liquid crystal display (LCD) is described as one example of the display device.

Figure 8:
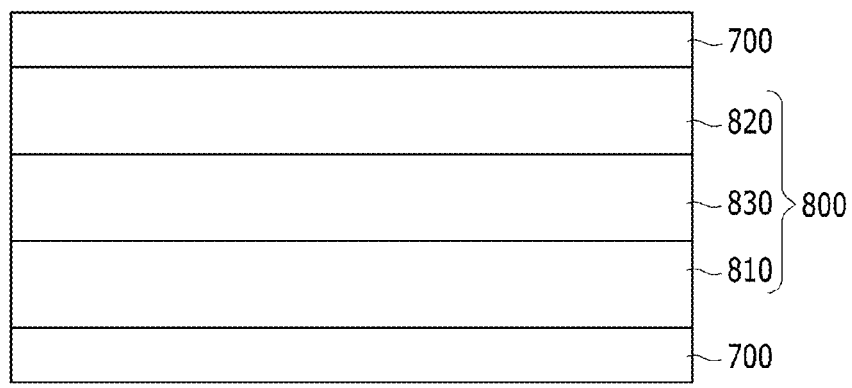
FIG. 8 is a schematic cross-sectional view showing a liquid crystal display (LCD) device according to an embodiment.
Figure 9:
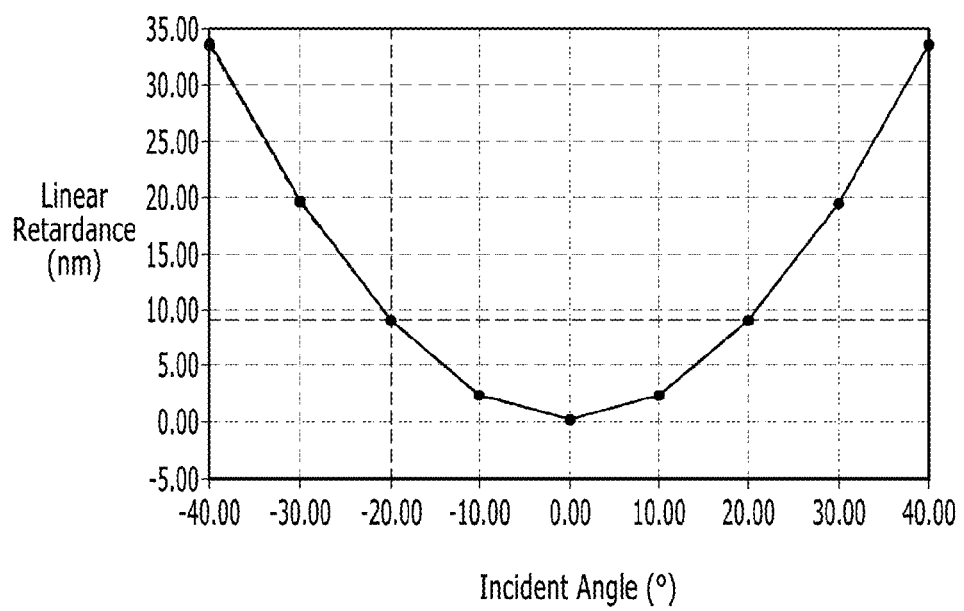
FIGS. 9 to 24 are graphs of linear retardance (nanometers, nm) versus incident angle (degree, °) showing retardation curves of each film according to Examples 1 to 11 and Comparative Examples 1 to 5.
Figure 10:
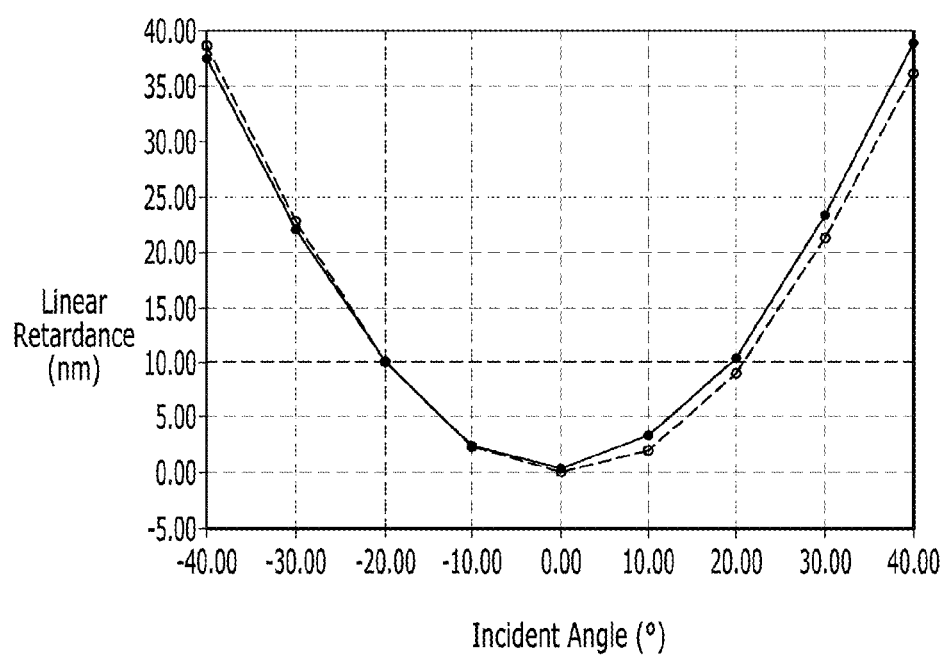
Figure 11:
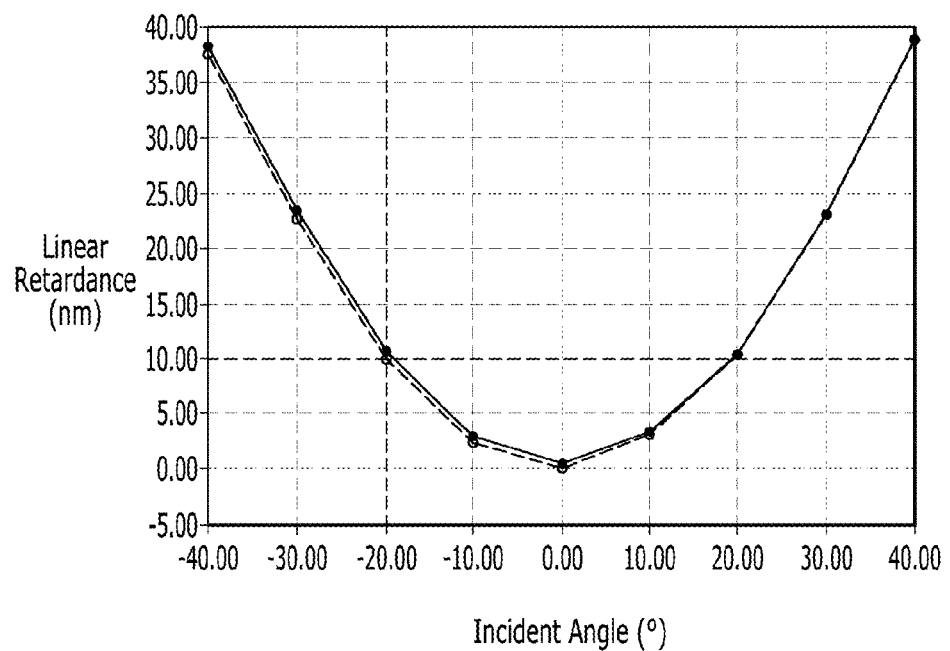
Figure 12:
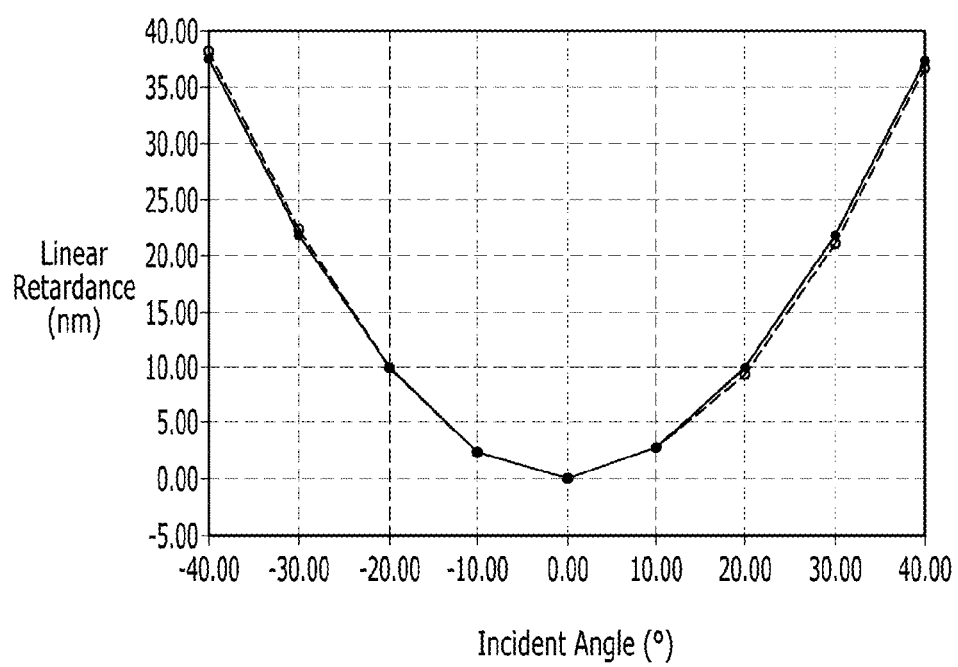
Figure 13:
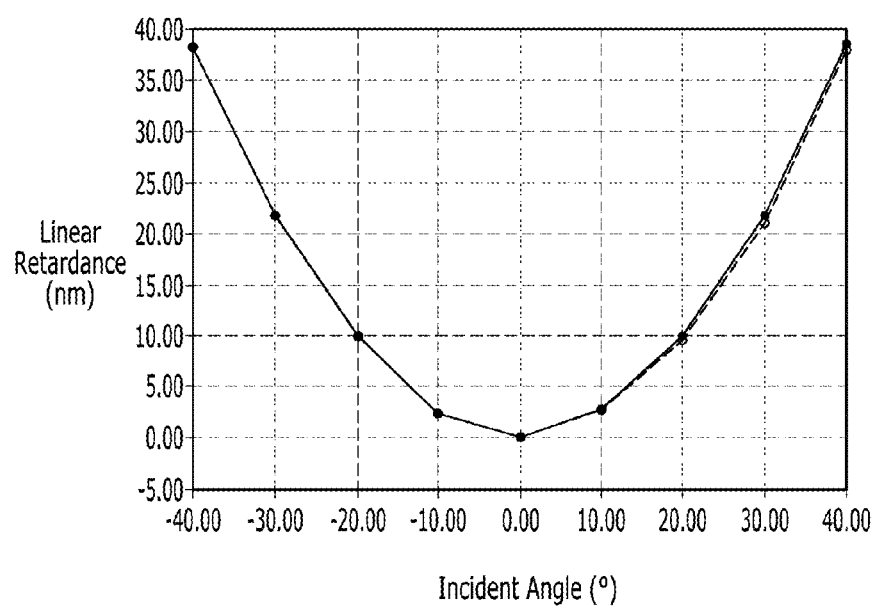
Figure 14:
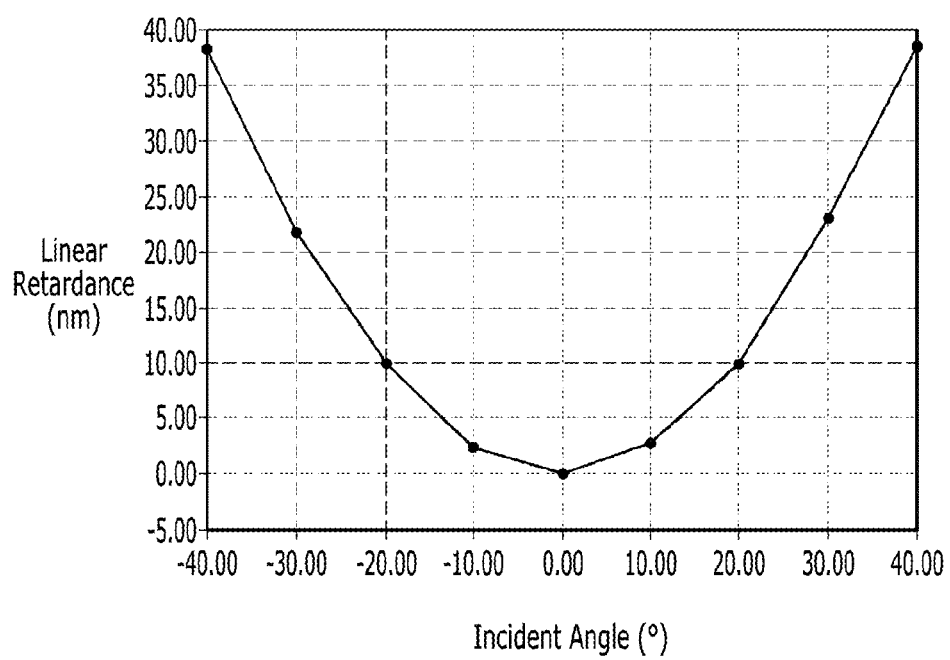
Figure 15:
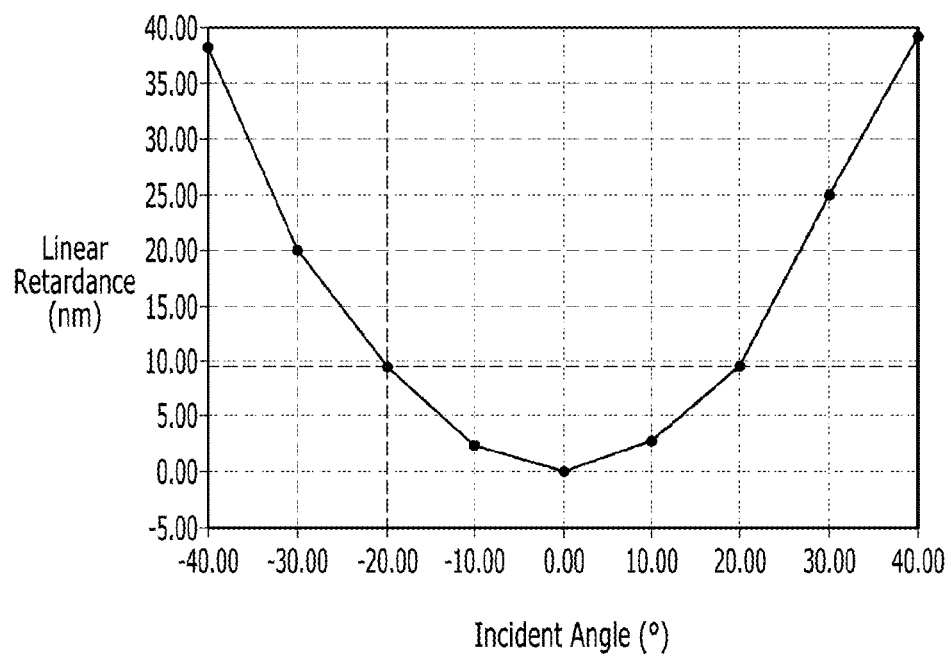
Figure 16:
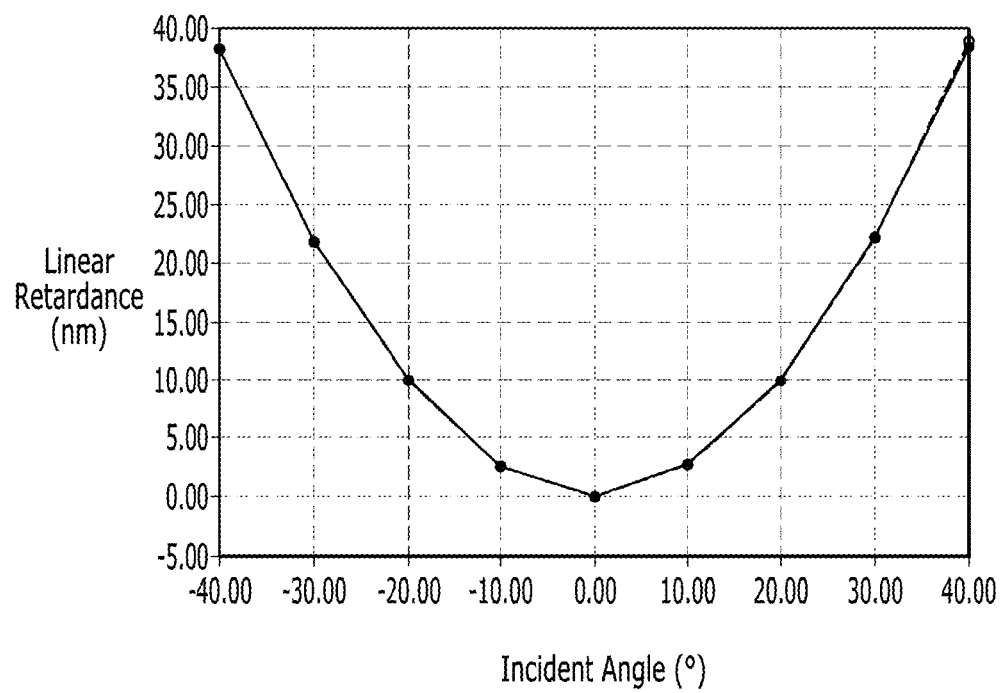
Figure 17:
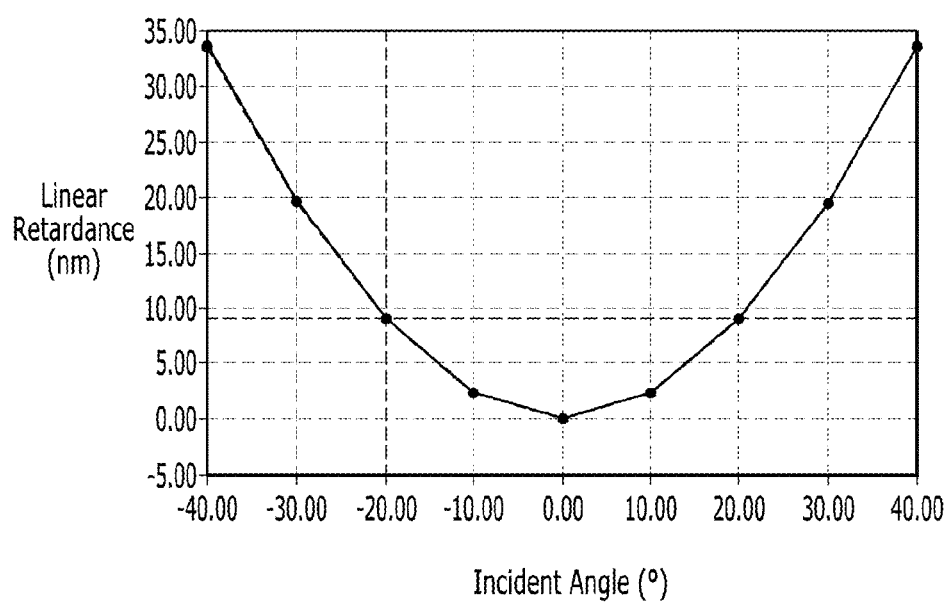
Figure 18:
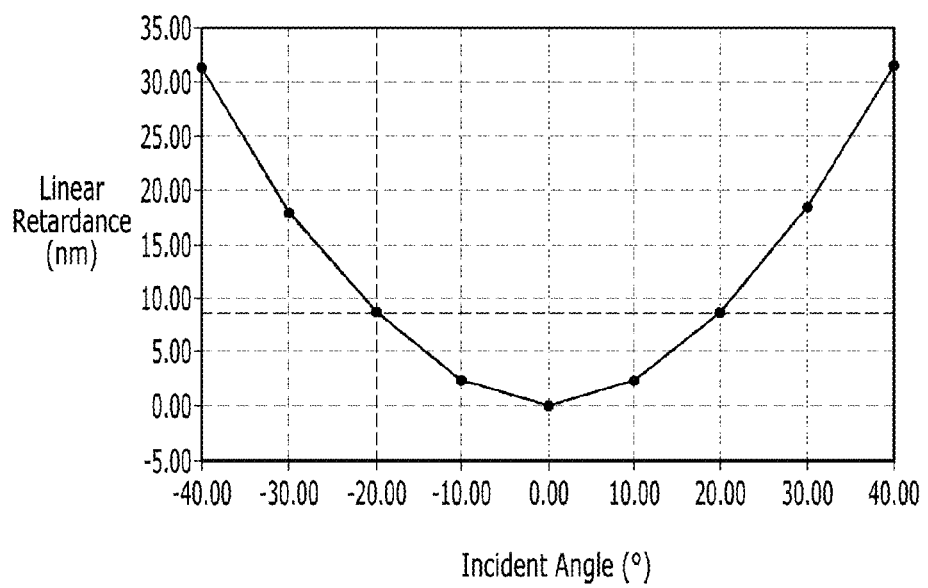
Figure 19:
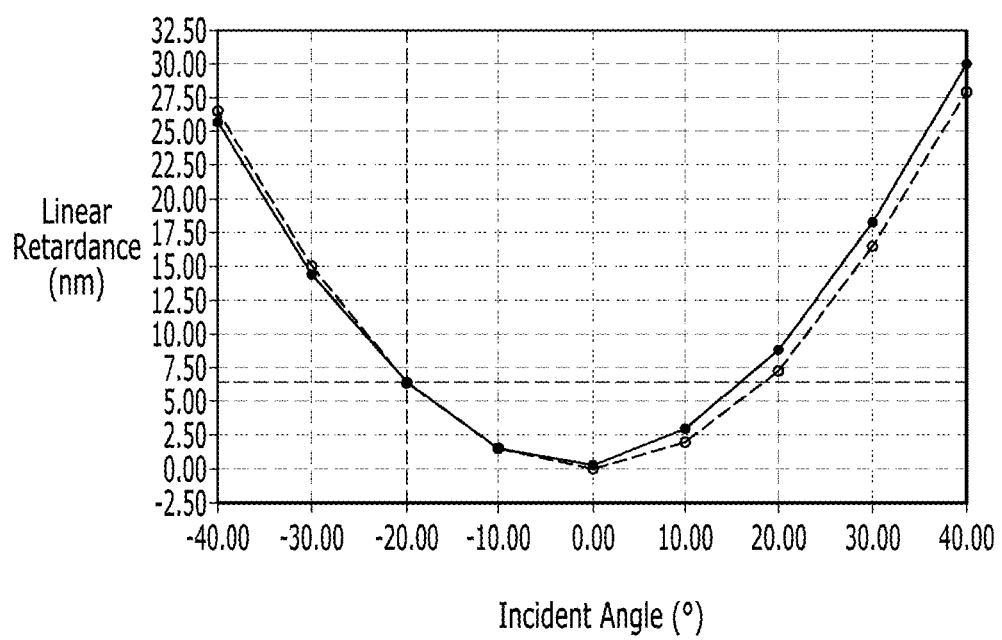
Figure 20:
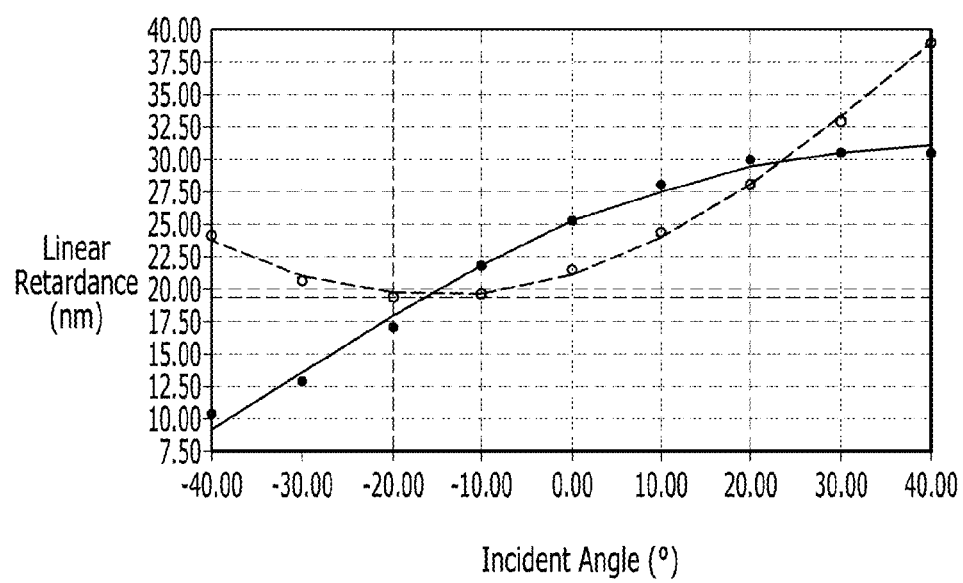
Figure 21:
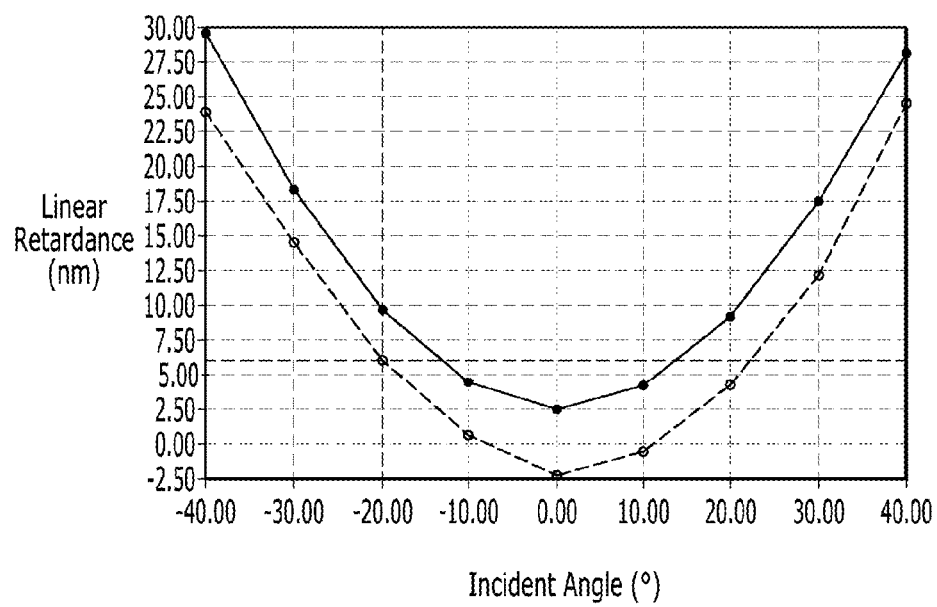
Figure 22:
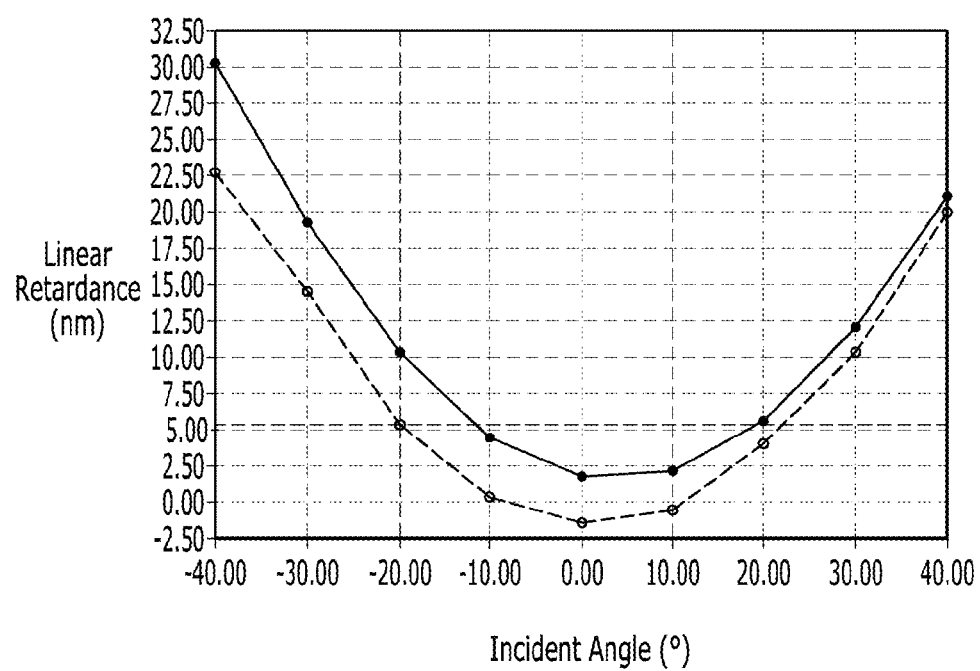
Figure 23:
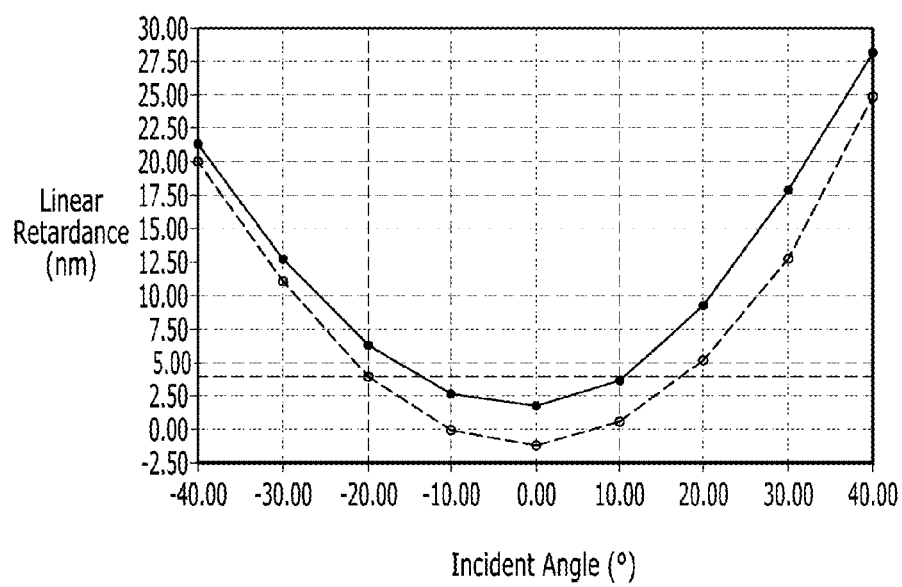
Figure 24:
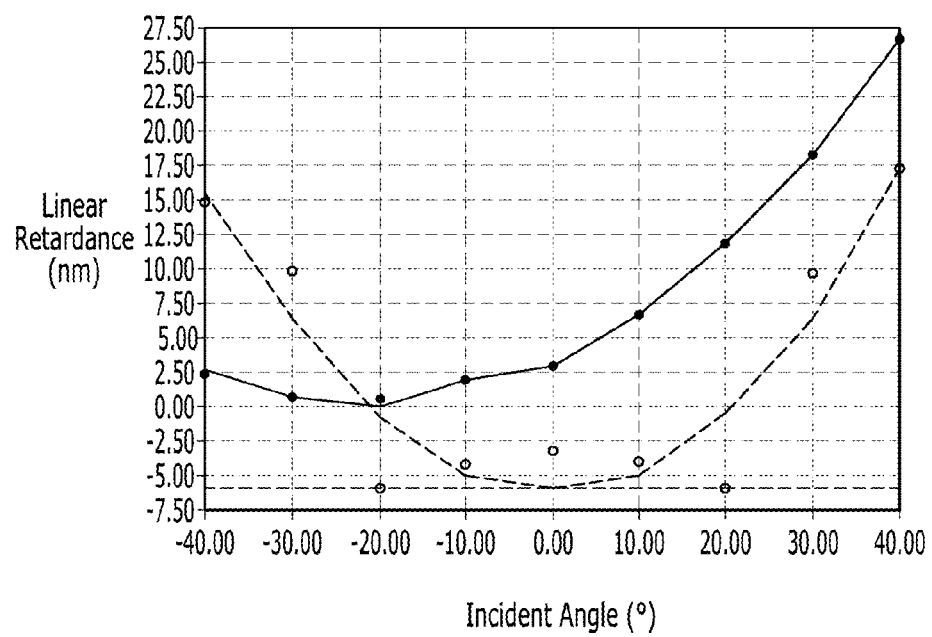

FIG. 8 is a schematic cross-sectional view of a liquid crystal display (LCD) device according to an embodiment.

Referring to FIG. 8, the liquid crystal display (LCD) according to an embodiment includes a liquid crystal panel 800, and a film 700 positioned on one side of the liquid crystal panel 800.

The liquid crystal panel 800 may be a twist nematic (TN) mode panel, a homeotropic alignment (PVA) mode panel, an in-plane switching (IPS) mode panel, an optically compensated bend (OCB) mode panel, or the like.

The liquid crystal panel 800 may include a first display panel 810, a second display panel 820, and a liquid crystal layer 830 interposed between the first display panel 810 and the second display panel 820.

The first display panel 810 may include, for example, a thin film transistor (not shown) formed on a substrate (not shown) and a first electric field generating electrode (not shown) connected to the thin film transistor. The second display panel 820 may include, for example, a color filter (not shown) formed on a substrate (not shown) and a second electric field generating electrode (not shown). However, it is not limited thereto, and the color filter may be included in the first display panel 810, while the first electric field generating electrode and the second electric field generating electrode may be disposed on the first display panel 810 together therewith.

The liquid crystal layer 830 may include a plurality of liquid crystal molecules. The liquid crystal molecules may have positive or negative dielectric anisotropy. When the liquid crystal molecules have positive dielectric anisotropy, the major axes thereof may be aligned substantially parallel to the surface of the first display panel 810 and the second display panel 820 when an electric field is not applied, and the major axes may be aligned substantially perpendicular to the surface of the first display panel 810 and second display panel 820 when an electric field is applied. On the other hand, when the liquid crystal molecules have negative dielectric anisotropy, the major axes may be aligned substantially perpendicular to the surface of the first display panel 810 and the second display panel 820 when an electric field is not applied, and the major axes may be aligned substantially parallel to the surface of the first display panel 810 and the second display panel 820 when an electric field is applied.

The film 700 may be the optical film 100, the compensation film 300, or the anti-reflective film 500. Films 700 are disposed on the outside of the liquid crystal panel 800. Although the films are shown to be provided on both the lower part and the upper part of the liquid crystal panel 800 in the drawing, they are not limited thereto, and the films may be formed on one of the lower part and the upper part of the liquid crystal panel 800.

Hereinafter, the present disclosure is illustrated in more detail with reference to examples. However, these examples are exemplary, and the present disclosure is not limited thereto.

PREPARATION OF COMPOSITION

Preparation Example 1

1.50 grams (g) (30.00 wt %) of a liquid crystal represented by the following Chemical Formula A1, 0.038 g (0.76 wt %) of a silane compound represented by the following Chemical Formula 1a, 0.074 g (1.45 wt %) of a photopolymerization compound represented by the following Chemical Formula C1, 0.068 g (1.36 wt %) of 2,2'-dimethoxy-2-phenylacetophenone (a photoinitiator), and 3.32 g (66.43 wt %) of propylene glycole methyl ether acetate (PGMEA) are mixed, and the mixture is agitated on a 45° C. hot plate for one hour to prepare a composition.

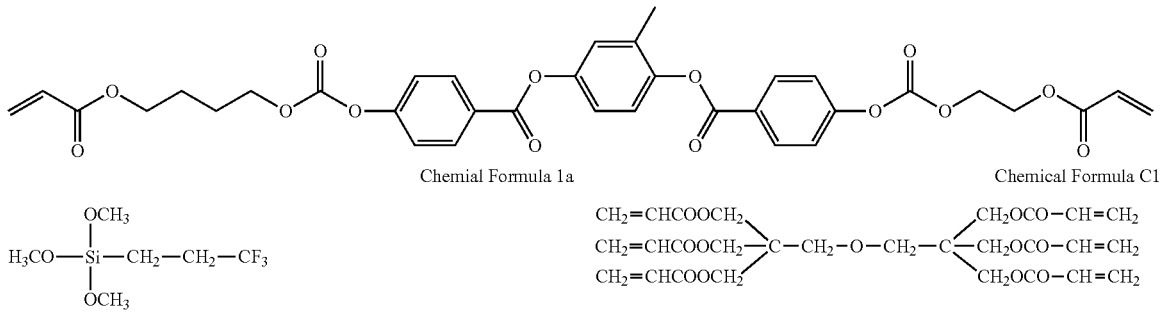

Chemical Formula A1

Chemical Formula 1a

Chemical Formula C1

Preparation Example 2

1.50 g (30.00 wt %) of a liquid crystal represented by the Chemical Formula A1, 0.033 g (0.66 wt %) of a silane compound represented by the Chemical Formula 1a, 0.074 g (1.45 wt %) of a photopolymerization compound represented by the Chemical Formula C1, 0.068 g (1.36 wt %) of 2,2'-dimethoxy-2-phenylacetophenone (a photoinitiator), and 3.325 g (66.53 wt %) of propylene glycole methyl ether acetate (PGMEA) are mixed, and the mixture is agitated on a 45° C. hot plate for one hour to prepare a composition.

Preparation Example 3

1.50 g (30.00 wt %) of a liquid crystal represented by the Chemical Formula A1, 0.043 g (0.86 wt %) of a silane compound represented by the Chemical Formula 1a, 0.074 g (1.45 wt %) of a photopolymerization compound represented by the Chemical Formula C1, 0.068 g (1.36 wt %) of 2,2'-dimethoxy-2-phenylacetophenone (a photoinitiator), and 3.315 g (66.33 wt %) of propylene glycole methyl ether acetate (PGMEA) are mixed, and the mixture is agitated on a 45° C. hot plate for 1 hour to prepare a composition.

Preparation Example 4

1.50 g (30.00 wt %) of a liquid crystal represented by the Chemical Formula A1, 0.052 g (1.04 wt %) of a silane compound represented by the Chemical Formula 1a, 0.074 g (1.45 wt %) of a photopolymerization compound represented by the Chemical Formula C1, 0.068 g (1.36 wt %) of 2,2'-dimethoxy-2-phenylacetophenone (a photoinitiator), and 3.306 g (66.15 wt %) of propylene glycole methyl ether acetate (PGMEA) are mixed, and the mixture is agitated on a 45° C. hot plate for one hour to prepare a composition.

Preparation Example 5

1.50 g (30.00 wt %) of a liquid crystal represented by the Chemical Formula A1, 0.038 g (0.76 wt %) of a silane compound represented by the Chemical Formula 1a, 0.064 g (1.28 wt %) of a photopolymerization compound represented by the Chemical Formula C1, 0.068 g (1.36 wt %) of 2,2'-dimethoxy-2-phenylacetophenone (a photoinitiator), and 3.33 g (66.6 wt %) of propylene glycole methyl ether acetate (PGMEA) are mixed, and the mixture is agitated on a 45° C. hot plate for 1 hour to prepare a composition.

Preparation Example 6

1.50 g (30.00 wt %) of a liquid crystal represented by the Chemical Formula A1, 0.038 g (0.76 wt %) of a silane compound represented by the Chemical Formula 1a, 0.084 g (1.67 wt %) of a photopolymerization compound represented by the Chemical Formula C1, 0.068 g (1.36 wt %) of 2,2'-dimethoxy-2-phenylacetophenone (a photoinitiator), and 3.31 g (66.21 wt %) of propylene glycole methyl ether acetate (PGMEA) are mixed, and the mixture is agitated on a 45° C. hot plate for 1 hour to prepare a composition.

Preparation Example 7

1.50 g (30.00 wt %) of a liquid crystal represented by the Chemical Formula A1, 0.038 g (0.76 wt %) of a silane compound represented by the Chemical Formula 1a, 0.118 g (2.37 wt %) of a photopolymerization compound represented by the Chemical Formula C1, 0.068 g (1.36 wt %) of 2,2'-dimethoxy-2-phenylacetophenone (a photoinitiator), and 3.276 g (65.51 wt %) of propylene glycole methyl ether acetate (PGMEA) are mixed, and the mixture is agitated on a 45° C. hot plate for 1 hour to prepare a composition.

Preparation Example 8

1.50 g (30.00 wt %) of a liquid crystal represented by the Chemical Formula A1, 0.038 g (0.76 wt %) of a silane compound represented by the Chemical Formula 1a, 0.160 g (3.19 wt %) of a photopolymerization compound represented by the Chemical Formula C1, 0.068 g (1.36 wt %) of 2,2'-dimethoxy-2-phenylacetophenone (a photoinitiator), and 3.234 g (64.69 wt %) of propylene glycole methyl ether acetate (PGMEA) are mixed, and the mixture is agitated on a 45° C. hot plate for 1 hour to prepare a composition.

Preparation Example 9

1.50 g (30.00 wt %) of a liquid crystal represented by the Chemical Formula A1, 0.038 g (0.76 wt %) of a silane compound represented by the Chemical Formula 1a, 0.222 g (4.43 wt %) of a photopolymerization compound represented by the Chemical Formula C1, 0.068 g (1.36 wt %) of 2,2'-dimethoxy-2-phenylacetophenone (a photoinitiator), and 3.172 g (63.45 wt %) of propylene glycole methyl ether acetate (PGMEA) are mixed, and the mixture is agitated on a 45° C. hot plate for 1 hour to prepare a composition.

Preparation Example 10

1.50 g (30.00 wt %) of a liquid crystal represented by the Chemical Formula A1, 0.038 g (0.76 wt %) of a silane compound represented by the Chemical Formula 1a, 0.265 g (5.31 wt %) of a photopolymerization compound represented by the Chemical Formula C1, 0.068 g (1.36 wt %) of 2,2'-dimethoxy-2-phenylacetophenone (a photoinitiator), and 3.129 g (62.57 wt %) of propylene glycole methyl ether acetate (PGMEA) are mixed, and the mixture is agitated on a 45° C. hot plate for one hour to prepare a composition.

Comparative Preparation Example 1

1.50 g (30.00 wt %) of a liquid crystal represented by the Chemical Formula A1, 0.068 g (1.36 wt %) of 2,2'-dimethoxy-2-phenylacetophenone (a photoinitiator), and 3.432 g (68.64 wt %) of propylene glycole methyl ether acetate (PGMEA) are mixed, and the mixture is agitated on a 45° C. hot plate for one hour to prepare a composition.

Comparative Preparation Example 2

1.50 g (30.00 wt %) of a liquid crystal represented by the Chemical Formula A1, 0.038 g (0.76 wt %) of a silane compound represented by the Chemical Formula 1a, 0.068 g (1.36 wt %) of 2,2'-dimethoxy-2-phenylacetophenone (a photoinitiator), and 3.394 g (67.88 wt %) of propylene glycole methyl ether acetate (PGMEA) are mixed, and the mixture is agitated on a 45° C. hot plate for 1 hour to prepare a composition.

Comparative Preparation Example 3

1.50 g (30.00 wt %) of a liquid crystal represented by the Chemical Formula A1, 0.074 g (1.45 wt %) of a photopolymerization compound, 0.068 g (1.36 wt %) of 2,2'-dimethoxy-2-phenylacetophenone (a photoinitiator), and 3.358 g (67.19 wt %) of propylene glycole methyl ether acetate (PGMEA) are mixed, and the mixture is agitated on a 45° C. hot plate for 1 hour to prepare a composition.

Comparative Preparation Example 4

A composition is prepared according to the same method as disclosed in Preparation Example 1, except for using a silane compound represented by the following Chemical Formula 1 b instead of the silane compound represented by the Chemical Formula 1a.

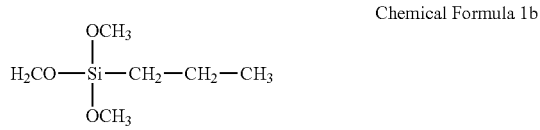

Chemical Formula 1b

Manufacture of Film

Example 1

The composition of Preparation Example 1 is spin-coated on a 1 millimeter (mm)-thick glass substrate at 1,000 revolutions per minute (rpm) for 30 seconds. The coated substrate is allowed to stand in an 80° C. oven for 2 minutes and at room temperature for 2 minutes, and is then dried and cooled down to form a liquid crystal layer. Subsequently, the liquid crystal layer is cured to form a film on the substrate by radiating ultraviolet (UV) rays at 1,000 milliJoules per square centimeter (mJ/cm²).

Example 2

A film is formed according to the same method as Example 1, except for using the composition of Preparation Example 2 instead of the composition of Preparation Example 1.

Example 3

A film is formed according to the same method as Example 1, except for using the composition of Preparation Example 3 instead of the composition of Preparation Example 1.

Example 4

A film is formed according to the same method as Example 1, except for using the composition of Preparation Example 4 instead of the composition of Preparation Example 1.

Example 5

A film is formed according to the same method as Example 1, except for using the composition of Preparation Example 5 instead of the composition of Preparation Example 1.

Example 6

A film is formed according to the same method as Example 1, except for using the composition of Preparation Example 6 instead of the composition of Preparation Example 1.

Example 7

A film is formed according to the same method as Example 1, except for using the composition of Preparation Example 7 instead of the composition of Preparation Example 1.

Example 8

A film is formed according to the same method as Example 1, except for using the composition of Preparation Example 8 instead of the composition of Preparation Example 1.

Example 9

A film is formed according to the same method as Example 1, except for using the composition of Preparation Example 9 instead of the composition of Preparation Example 1.

Example 10

A film is formed according to the same method as Example 1, except for using the composition of Preparation Example 10 instead of the composition of Preparation Example 1.

Example 11

A film is formed according to the same method as Example 1, except for using a 20 micrometer (μm)-thick polycarbonate substrate instead of the glass substrate.

Comparative Example 1

A film is formed according to the same method as Example 1, except for using the composition of Comparative Preparation Example 1 instead of the composition of Preparation Example 1.

Comparative Example 2

A film is formed according to the same method as Example 1, except for using the composition of Comparative Preparation Example 2 instead of the composition of Preparation Example 1.

Comparative Example 3

A film is formed according to the same method as Example 1, except for using the composition of Comparative Preparation Example 3 instead of the composition of Preparation Example 1.

Comparative Example 4

A film is formed according to the same method as Example 1, except for using the composition of Comparative Preparation Example 4 instead of the composition of Preparation Example 1.

Comparative Example 5

A film is formed according to the same method as Example 11, except for using the composition of Comparative Preparation Example 4 instead of the composition of Preparation Example 1.

Evaluation

Evaluation 1

Retardation of the films prepared according to Examples 1 to 11 and Comparative Examples 1 to 5 is measured.

The retardation is measured by using AxoScan™ (Axometrics).

The results are shown in Table 1 and illustrated in FIGS. 9 to 24.

FIGS. 9 to 24 are graphs showing retardation curves of each film according to Examples 1 to 11 and Comparative Examples 1 to 5.

TABLE 1

|  | In-plane phase retardation ($R_O$, @550 nm) | Thickness direction retardation ($R_{th}$, @550 nm) |
| --- | --- | --- |
| Example 1 | 0.0 nm | −183.3 nm |
| Example 2 | 0.427 nm | −186.35 nm |
| Example 3 | 0.26 nm | −188.46 nm |
| Example 4 | 0.079 nm | −184.57 nm |
| Example 5 | 0.119 nm | −187.12 nm |
| Example 6 | 0.11 nm | −188.71 nm |
| Example 7 | 0.024 nm | −170.17 nm |
| Example 8 | 0.117 nm | −189.80 nm |
| Example 9 | 0.041 nm | −165.63 nm |
| Example 10 | 0.074 nm | −154.36 nm |
| Example 11 | 0.3 nm | 135.8 nm |
| Comparative Example 1 | 23.3 nm | −12.5 nm |
| Comparative Example 2 | 2.1 nm | 131.6 nm |
| Comparative Example 3 | 1.7 nm | 114.8 nm |
| Comparative Example 4 | 1.6 nm | 183.3 nm |
| Comparative Example 5 | 3.1 nm | 135.8 nm |

In FIGS. 9 to 24, a dotted curved line indicates a tilt about a fast axis of a liquid crystal layer, and a solid curved line indicates a tilt about a slow axis of the liquid crystal layer. When two curved lines of the fast axis and the slow axis symmetrically form a letter U in a graph, the liquid crystal layer shows the same or similar retardation of about the same incident angle. That is, as the curved lines of the fast axis and the slow axis are more symmetrical, a liquid crystal layer is more homeotropic, and thus has in-plane phase retardation ($R_O$) closer to 0.

Referring to Table 1 and FIGS. 9 to 19, the liquid crystal layers prepared according to Examples 1 to 11 respectively show satisfactory retardation graphs about an incident angle and very low in-plane phase retardation ($R_O$) of less than or equal to about 1.0 nm. Herein, since the in-plane phase retardation ($R_O$) of a film receives an influence from in-plane phase retardation of a substrate itself other than in-plane phase retardation of the liquid crystal layer, the liquid crystal layer has in-plane phase retardation ($R_O$) of substantial 0 when the film having in-plane phase retardation ($R_O$) of less than or equal to about 1 nm.

Evaluation 2

The alignment state of the liquid crystal layers according to Examples 1 and 11 and Comparative Examples 1 to 5 is examined by using a polarized optical microscope.

The films of Examples 1 and 11 and Comparative Examples 1 to 5 are disposed on specimen holders after the polarizer and analyzer of the polarized optical microscope (EclipseLV100POL, NIKON) are perpendicularly positioned to have an angle of 90°. Then, the color of the films (whether the films are black or not) is examined. Perfect black shows that a liquid crystal layer has satisfactory homeotropic alignment, but a lower degree of black shows that the liquid crystal layer has insufficient homeotropic alignment and leaks light.

The results are provided in FIGS. 25 to 31.

Figure 25:
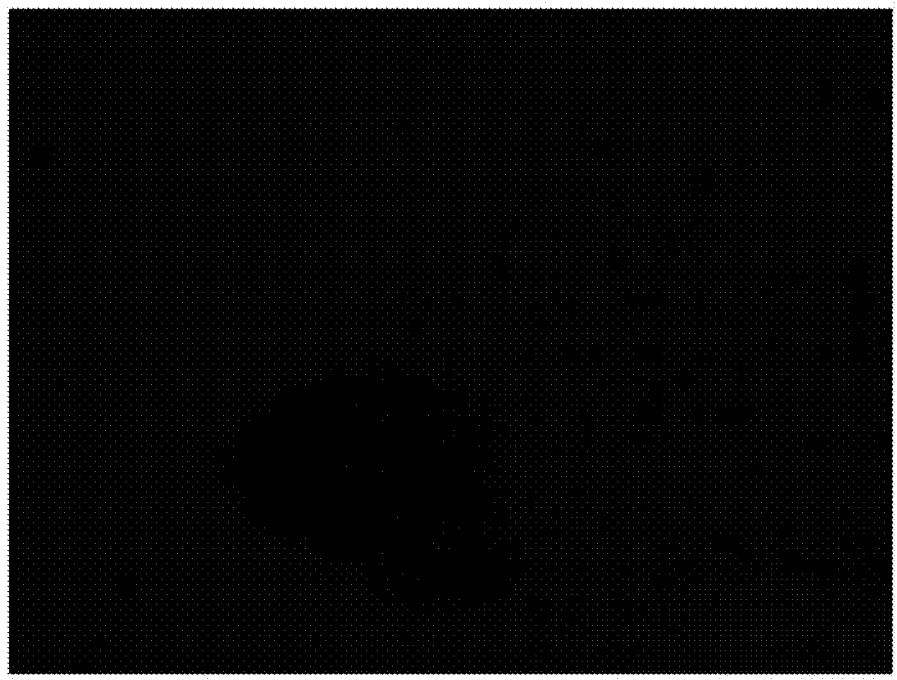
FIG. 25 is a polarized optical microscope photograph showing the film according to Example 1.
Figure 26:
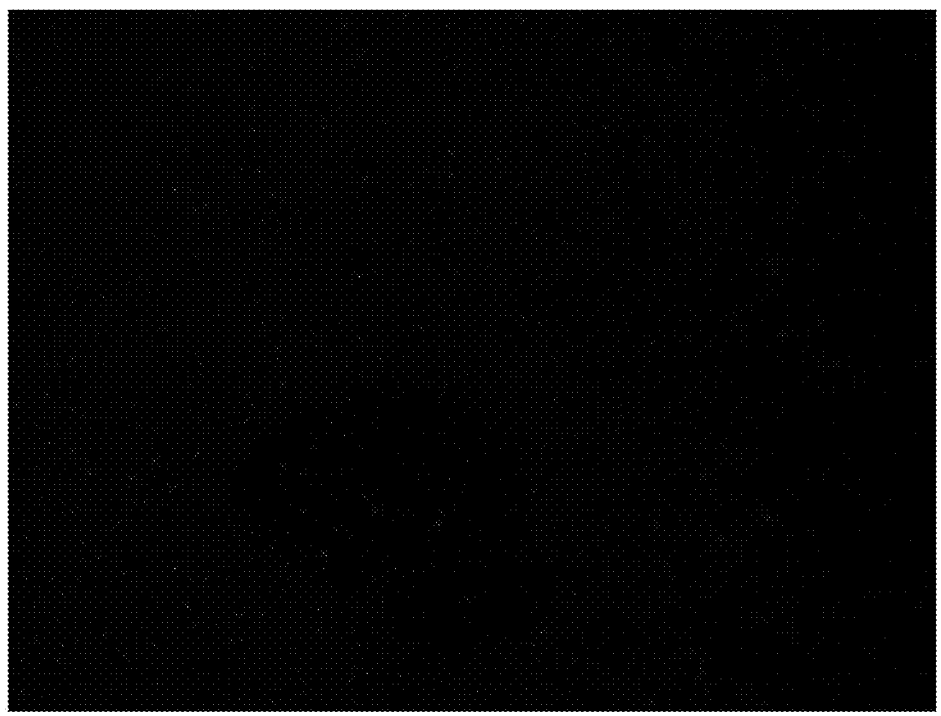
FIG. 26 is a polarized optical microscope photograph showing the film according to Example 11.
Figure 27:
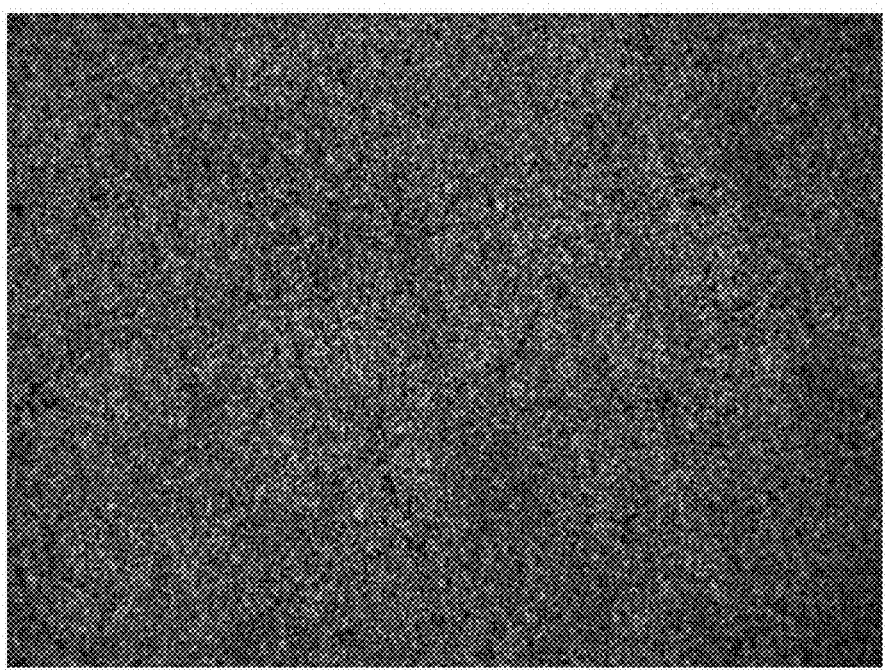
FIG. 27 is a polarized optical microscope photograph showing the film according to Comparative Example 1.
Figure 28:
FIG. 28 is a polarized optical microscope photograph showing the film according to Comparative Example 2.
Figure 29:
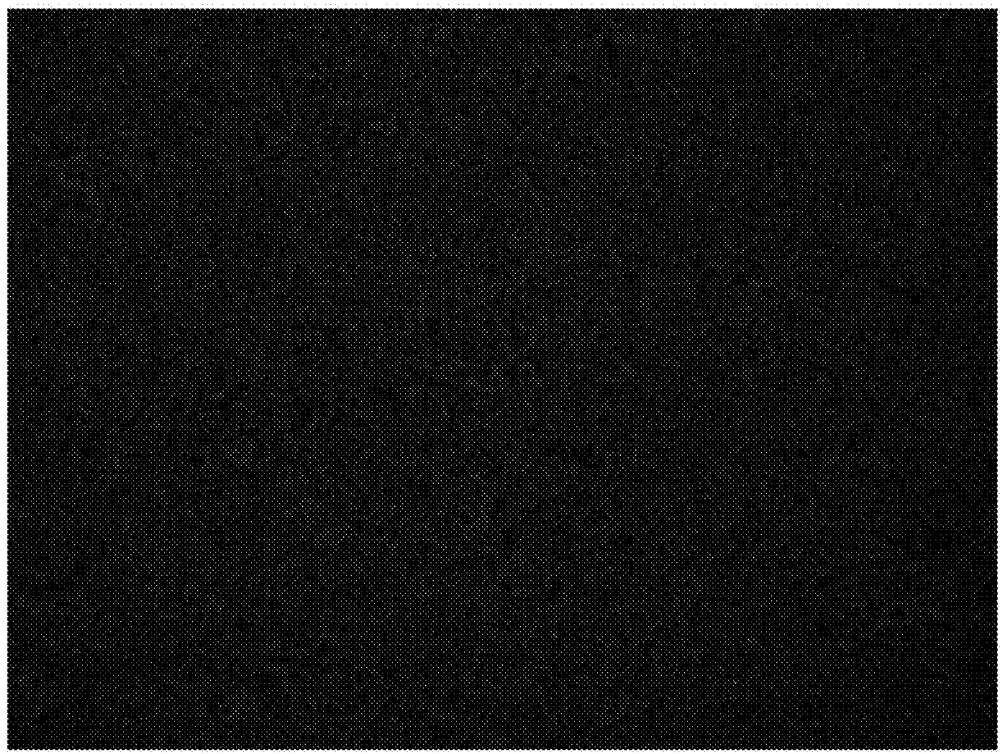
FIG. 29 is a polarized optical microscope photograph showing the film according to Comparative Example 3.
Figure 30:
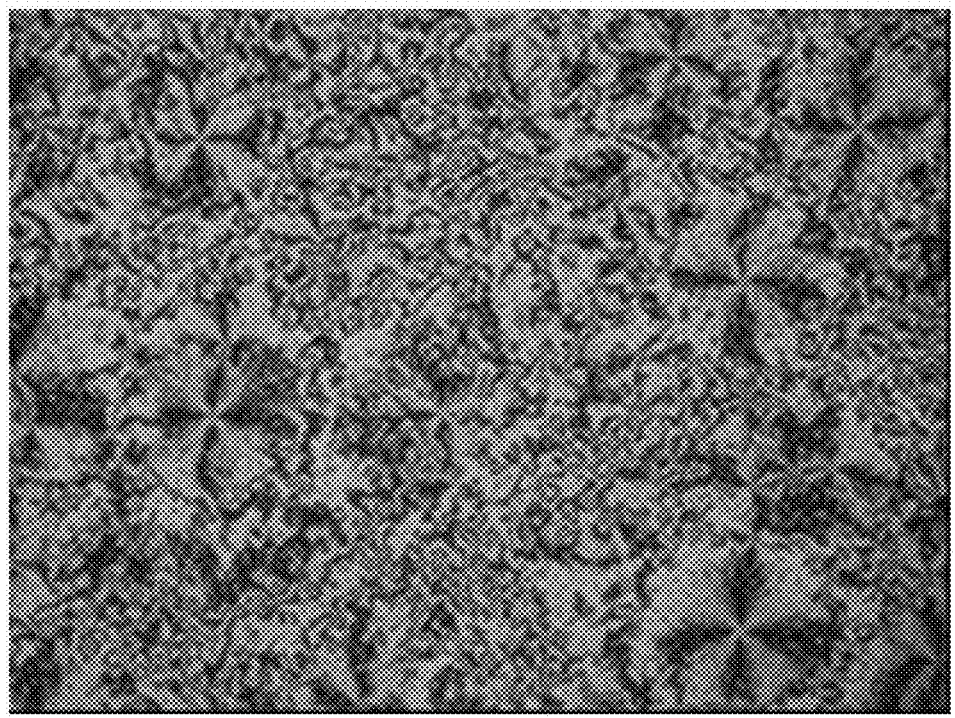
FIG. 30 is a polarized optical microscope photograph showing the film according to Comparative Example 4.
Figure 31:
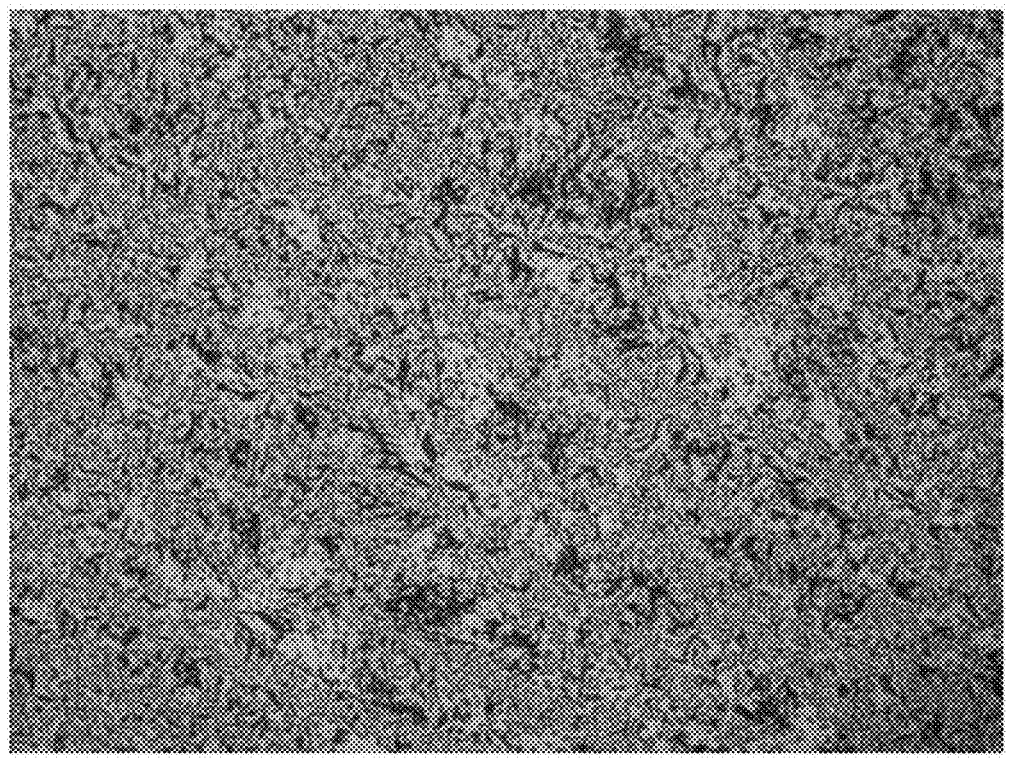
FIG. 31 is a polarized optical microscope photograph showing the film according to Comparative Example 5.

FIG. 25 is a polarized optical microscope photograph of the film prepared according to Example 1, FIG. 26 is a polarized optical microscope photograph of the film prepared according to Example 11, FIG. 27 is a polarized optical microscope photograph of the film prepared according to Comparative Example 1, FIG. 28 is a polarized optical microscope photograph of the film prepared according to Comparative Example 2, FIG. 29 is a polarized optical microscope photograph of the film prepared according to Comparative Example 3, FIG. 30 is a polarized optical microscope photograph of the film prepared according to Comparative Example 4, and FIG. 31 is a polarized optical microscope photograph of the film prepared according to Comparative Example 5.

Referring to FIGS. 25 and 26, the films of Examples 1 and 11 show perfect black color. Accordingly, the films of Example 1 and 11 have substantially perfect homeotropic alignment of liquid crystals in the liquid crystal layers.

On the other hand, referring to FIGS. 27 to 31, the films of Comparative Examples 1 to 5 show imperfect black color and leak light. The films of Comparative Examples 1 to 5 appear to have imperfect homeotropic alignment of liquid crystals in the liquid crystal layers.

While this inventive concept has been described in connection with what is presently considered to be practical exemplary embodiments, it is to be understood that the inventive concept is not limited to the disclosed embodiments, but, on the contrary, is intended to cover various modifications and equivalent alignments included within the spirit and scope of the appended claims.

What is claimed is:

1. A composition for an optical film, comprising:
a homeotropic liquid crystal;
a silane or germane compound comprising at least one fluorine at a terminal end thereof; and
a polymerizable compound,
wherein the silane or germane compound is represented by Chemical Formula 2:

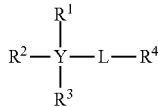

Chemical Formula 2 wherein, in Chemical Formula 2,
Y is Si or Ge;
$R^1$ to $R^3$ are each independently hydrogen, a substituted or unsubstituted C1 to C20 alkyl group, a substituted or unsubstituted C6 to C30 aryl group, a substituted or unsubstituted C2 to C20 alkanoyl group, a substituted or unsubstituted C2 to C20 alkanoyloxy group, a substituted or unsubstituted C2 to C20 alkanoylalkyl group, a substituted or unsubstituted C2 to C20 alkanoyloxyalkyl group, or a combination thereof,
L is a single bond, a substituted, unsubstituted C1 to C12 alkylene group, a substituted or unsubstituted C1 to C12 heteroalkylene group, a substituted or unsubstituted C7-C30 alkylarylene group, a substituted or unsubstituted C7-C30 arylalkylene group, and
$R^4$ is fluorine or C1 to C3 fluoroalkyl group.

2. The composition for an optical film of claim 1, wherein the homeotropic liquid crystal is represented by Chemical Formula A:

$(P_1—S^1—X^1)_{n1}$-MG-$(X^2—S^2—P^2)_{n2}$   Chemical Fromula A wherein in Chemical Formula A,
MG is a rod-shaped mesogenic group,
$X^1$ and $X^2$ are each independently a single bond, —O—, —S—, —C(=O)—, —O(C=O)—, —(O=C)O—, —O(C=O)O—, any one of groups (a) to (k), or a combination thereof, —N=N—   (a)

—CH=CH—   (b)

—C≡C—   (c)

—CH=N—   (d)

   (e)

-continued

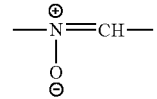   (f)

—CH=C=CH—   (g)

—CH=C=N—   (h)

—N=C=N—   (i)

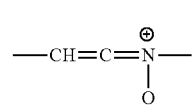   (j)

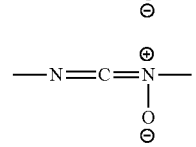   (k)

$S^1$ and $S^2$ are each independently a single bond or a substituted or unsubstituted C1 to C30 spacer group,
$P^1$ and $P^2$ are each independently a polymerizable functional group, and
$n^1$ and $n^2$ are each independently 0 or 1, provided that $n^1$ and $n^2$ are not simultaneously 0.

3. The composition for an optical film of claim 1, wherein the polymerizable compound is represented by Chemical Formula C:

$(P^3—(CH_2)_{s1})_{T1}—CR_{(3-T1)}(CH_2)_{q1}—O—(CH_2)_{q2}—$
$CR_{(3-T2)}—((CH_2)_{s2}—P^4)_{T2}$   Chemical Formula C wherein in Chemical Formula C,
R is hydrogen or a methyl group,
$P^3$ and $P^4$ are each independently a polymerizable functional group,
S1, S2, q1, and q2 are each independently 0 or 1,
T1 and T2 are each independently 2 or 3.

4. The composition for an optical film of claim 1, wherein the polymerizable compound comprises a compound having 4 to 10 acryloyl or acryloxy groups.

5. The composition for an optical film of claim 1, further comprising a solvent, and
wherein the composition comprises about 5 to about 50 percent by weight of the homeotropic liquid crystal, about 0.1 to about 1.1 percent by weight of the silane or germane compound, and about 1 to about 10 percent by weight of the polymerizable compound based on the total weight of the composition, and
wherein the rest of the composition is the solvent.

6. The composition for an optical film of claim 1, further comprising a photoinitiator, wherein an amount of the photoinitiator is about 0.1 to about 2 percent by weight based on the total weight of the composition.

7. An optical film comprising:
a substrate, and
a liquid crystal layer positioned on one side of the substrate,
wherein the liquid crystal layer comprises a homeotropic liquid crystal, a silane or germane compound comprising at least one fluorine at a terminal end thereof, and a polymer,
wherein the silane or germane compound is represented by Chemical Formula 2:

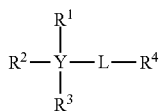

Chemical Formula 2 wherein, in Chemical Formula 2,

Y is Si or Ge;

$R^1$ to $R^3$ are each independently hydrogen, a substituted or unsubstituted C1 to C20 alkyl group, a substituted or unsubstituted C6 to C30 aryl group, a substituted or unsubstituted C2 to C20 alkanoyl group, a substituted or unsubstituted C2 to C20 alkanoyloxy group, a substituted or unsubstituted C2 to C20 alkanoylalkyl group, a substituted or unsubstituted C2 to C20 alkanoyloxyalkyl group, or a combination thereof, L is a single bond, a substituted, unsubstituted C1 to C12 alkylene group, a substituted or unsubstituted C1 to C12 heteroalkylene group, a substituted or unsubstituted C7-C30 alkylarylene group, a substituted or unsubstituted C7-C30 arylalkylene group, and $R^4$ is fluorine or C1 to C3 fluoroalkyl group.

8. The optical film of claim 7, wherein the homeotropic liquid crystal is arranged in a direction substantially perpendicular to the length direction of the substrate, and the silane or germane compound is arranged in a direction substantially parallel to the surface of the homeotropic liquid crystal.

9. The optical film of claim 7, wherein the polymer is positioned between two homeotropic liquid crystals.

10. The optical film of claim 7, wherein in-plane phase retardation $R_0$ of the liquid crystal layer for incident light of about a 550 nanometers wavelength is in a range of about 0 nanometers≤$R_0$≤about 1 nanometers.

11. The optical film of claim 10, wherein the absolute value of thickness direction retardation $R_{th}$ of the liquid crystal layer for incident light of about 550 nanometers wavelength is in a range of about 50 nanometers≤$R_{th}$≤about 300 nanometers.

12. The optical film of claim 7, wherein the liquid crystal layer has a refractive index satisfying Relationship Equation 1:

$$n_z > n_x = n_y \qquad \text{Relationship Equation 1}$$

wherein, in Relationship Equation 1, $n_x$ is a refractive index at a slow axis of the liquid crystal layer, $n_y$ is a refractive index at a fast axis of the liquid crystal layer, and $n_z$ is a refractive index in a direction perpendicular to the slow axis and the fast axis of the liquid crystal layer.

13. The optical film of claim 7, wherein an alignment layer is not interposed between the substrate and the liquid crystal layer.

14. A compensation film, comprising:

the optical film of claim 7, and a phase retardation film positioned on at least one side of the optical film.

15. The compensation film of claim 14, wherein the phase retardation film comprises a λ/4 phase retardation film, a λ/2 phase retardation film, or a combination thereof.

16. An anti-reflective film comprising:

the compensation film of claim 14, and a polarizer positioned on the compensation film.

17. A display device comprising:

a display panel, and the optical film of claim 7, the compensation film of claim 14, or the anti-reflective film of claim 16.

18. The display device of claim 17, wherein the display panel is a liquid crystal panel or an organic light emitting panel.

* * * * *